(12) United States Patent
Yamada et al.

(10) Patent No.: US 8,828,569 B2
(45) Date of Patent: Sep. 9, 2014

(54) BATTERY CAN FOR STORAGE BATTERY

(75) Inventors: Teruaki Yamada, Tokyo (JP); Kohji Miyoshi, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/114,779

(22) PCT Filed: May 1, 2012

(86) PCT No.: PCT/JP2012/061545
§ 371 (c)(1),
(2), (4) Date: Oct. 30, 2013

(87) PCT Pub. No.: WO2012/153675
PCT Pub. Date: Nov. 15, 2012

(65) Prior Publication Data
US 2014/0072841 A1    Mar. 13, 2014

(30) Foreign Application Priority Data
May 9, 2011    (JP) .................................. 2011-104422

(51) Int. Cl.
| H01M 2/12 | (2006.01) |
| B32B 15/01 | (2006.01) |
| C22C 38/02 | (2006.01) |
| H01M 2/04 | (2006.01) |
| C22C 38/00 | (2006.01) |
| C22C 38/06 | (2006.01) |
| C22C 38/12 | (2006.01) |
| C22C 38/04 | (2006.01) |
| H01M 2/02 | (2006.01) |
| C25D 7/00 | (2006.01) |
| C22C 38/14 | (2006.01) |
| C25D 5/48 | (2006.01) |

(52) U.S. Cl.
CPC ........... *H01M 2/1241* (2013.01); *B32B 15/015* (2013.01); *C22C 38/02* (2013.01); *H01M 2/0404* (2013.01); *C22C 38/004* (2013.01); *C22C 38/06* (2013.01); *C22C 38/12* (2013.01); *C22C 38/04* (2013.01); *C25D 5/48* (2013.01); *C22C 38/002* (2013.01); *Y02E 60/12* (2013.01); *H01M 2/024* (2013.01); *H01M 2/1229* (2013.01); *C22C 38/001* (2013.01); *C25D 7/00* (2013.01); *C22C 38/14* (2013.01)
USPC ............................................... 429/56; 429/53

(58) Field of Classification Search
CPC ........................... H01M 2/1241; H01M 2/1294
USPC ........................................................ 429/53, 56
See application file for complete search history.

(56) References Cited

U.S. PATENT DOCUMENTS

| 4,803,136 A * | 2/1989 | Bowsky et al. ................. 429/56 |
| 7,517,607 B2 * | 4/2009 | Kim ................................. 429/56 |
| 2005/0069760 A1 | 3/2005 | Somatomo |

FOREIGN PATENT DOCUMENTS

| JP | 59-79965 A | 5/1984 |
| JP | 2585726 Y2 | 11/1998 |
| JP | 2000-233247 A | 8/2000 |
| JP | 2000233247 A * | 8/2000 |
| JP | 2005-108584 A | 4/2005 |
| JP | 3893198 B2 | 3/2007 |
| JP | 2008-251438 A | 10/2008 |
| JP | 4346637 B2 | 10/2009 |

OTHER PUBLICATIONS

International Search Report, mailed Aug. 7, 2012, issued in PCT/JP2012/061545.
Office Action issued Dec. 4, 2012 in Japanese Patent Application 2012-542713.

\* cited by examiner

*Primary Examiner* — Zachary Best
(74) *Attorney, Agent, or Firm* — Birch, Stewart, Kolasch & Birch, LLP

(57) ABSTRACT

Disclosed is a battery can for a storage battery, provided with a safety valve having a first and a second score groove portion is provided to inner and outer surface of can bottom, can body, or can lid. The first and the second score groove portion face each other, and have a first and a second score groove bottom portion, which have a radius of curvature R, respectively. The R is more than 0.20 mm and less than 1.20 mm, and a distance between the bottom portions is 0.045 to 0.150 mm. The portion, which has the safety valve, is constituted by a plated steel sheet having a steel sheet portion of C content is less than 0.040 mass %, S content is less than 0.020 mass %, and tensile strength TS is less than 400 MPa, and a plate layer formed on a surface of the steel sheet portion.

20 Claims, 7 Drawing Sheets

BATTERY CAN FOR STORAGE BATTERY

TECHNICAL FIELD

The present invention relates to a battery can for a storage battery, which is provided with a score groove type safety valve. Particularly, the battery can for a storage battery is suitably used for an industrial use and an in-vehicle use.

Priority is claimed on Japanese Patent Application No. 2011-104422, filed on May 9, 2011, the content of which is incorporated herein by reference.

BACKGROUND ART

Recently, an assembled battery for an industrial use and an in-vehicle use, which uses a high-output battery, has been spreading quickly. In the assembled battery that is used for these purposes, there is a demand for continuing high performance (battery characteristics) over a long period of 10 to 15 years. Accordingly, there is a demand for individual batteries used in the assembled battery to have, for example, the following performance.

First, even when the assembled battery is used under harsh conditions over a long period of 10 to 15 years, there is a demand that deterioration in performance of an individual battery be small. Furthermore, the performance of the assembled battery in which a number of batteries are connected is greatly affected by battery performance of one battery having the lowest performance in the assembled battery. Thus, a variance in the battery performance of the individual batteries, which occurs due to deterioration of the battery performance during a long period of use, is demanded to be small. In addition, there is a demand for the individual batteries to secure satisfactory corrosion resistance for a long period of time.

As a technology in the related art, for example, the following Patent Documents 1 to 5 are exemplary examples.

Patent Document 1 discloses a thionyl chloride lithium battery that is used as a battery for an electronic apparatus. In this thionyl chloride lithium battery, a thin groove portion is provided at a part of a battery lid or a battery case, and a trapezoidal groove (score) on an inner side of a can is shown as a thin groove portion. In Patent Document 1, in a case where inner pressure increases during abnormality in a battery, the thin groove portion is allowed to be ruptured at low pressure, whereby the thin groove portion is used as a safety valve.

Patent Document 2 discloses a square-type sealed battery having a thin groove portion along a width direction of a sealing lid. The thin groove portion has a V-shaped cross-section, and is formed by press working.

Patent Document 3 discloses a cylindrical storage battery in which a rupture valve is formed in a diaphragm that is inversed due to an increase in inner pressure and blocks a current. In the cylindrical storage battery, a groove, which has a V-shaped cross-section and which is constituted by a combination of a circular curve positioned at a surface opposite to a surface of the diaphragm to which the inner pressure is applied, and a straight line of which one end intersects the circular curve and the other end is located on an outer periphery side of the diaphragm in relation to the circular curve, is formed as the rupture valve. In addition, in the cylindrical storage battery, a groove having a U-shaped cross-section is formed in a surface of the diaphragm to which the inner pressure is applied and which corresponds to the position at which the groove having the V-shaped cross-section is formed. In the straight groove, the depth on the other end side is shallower than the depth on the one end side. Furthermore, the depth of the groove having the U-shaped cross-section is shallower than the depth of the groove having the V-shaped cross-section.

Patent Document 4 and Patent Document 5 disclose an easy-open can lid that is opened by rupturing an opening formed in a can lid of a can body so the contents can be taken out, and a production method thereof. The easy-open can lid is different from the battery can in the technical field, and is used as a can lid for a beverage can or a food can. A resin-coated steel sheet is applied as a material of the can lid.

In the assembled battery (storage battery) for industrial use and in-vehicle use, which uses a high-output battery, there is a demand for a battery can capable of satisfying the characteristics necessary for the battery. The present inventors have found that it is necessary to consider the following performance for the battery can.

For example, performance stability of a safety valve during a long period of use is necessary for the battery can. Factors deteriorating the performance stability are as follows: a pressure variation in a battery can due to repetition of charging and discharging (that is, fatigue of the safety valve), and an effect by the contents such as an electrolytic solution (that is, corrosion of the safety valve). In addition, with regard to an individual battery can when being used as an assembled battery, it is necessary for the battery can to have a small variance in a valve opening pressure of the safety valve (that is, uniformity in performance of the safety valve).

However, the thionyl chloride lithium battery that is a primary battery does not perform charging and discharging, and thus in the battery can disclosed in Patent Document 1, it is not necessary to consider fatigue resistance of the safety valve. In addition, the primary battery for an electronic apparatus hardly ever constitutes an assembled battery, and thus a demand for uniformity in performance of the safety valve with respect to a plurality of batteries is not so high. Accordingly, in Patent Document 1, an expensive stainless steel sheet or nickel steel sheet, which has high corrosion resistance, is used, and a trapezoidal score groove is formed in one surface (inner surface of a battery) of the sheet in such a manner that the valve opening pressure may be adjusted by changing a width of the score groove.

In addition, in the square-type battery for portable apparatuses, which is disclosed in Patent Document 2, a life cycle of the apparatuses that are used is short, and is frequently shorter than 10 years, and thus a demand for the fatigue resistance with respect to the safety valve or uniformity in performance of the safety valve with respect to a plurality of batteries is not so high. Accordingly, in Patent Document 2, a V-shaped thin groove portion is used as the safety valve in order to progress a crack from the thin groove portion.

In Patent Document 3, the storage battery has a battery can in which a rupture valve is ruptured after inversion of the diaphragm, and to realize this function, a rupture valve is configured by a groove having a V-shaped cross-section, and a U-shaped groove which is opposite to the groove having a V-shaped cross-section. Accordingly, in the storage battery disclosed in Patent Document 3, a demand for the fatigue resistance with respect to the rupture valve or uniformity in performance of the safety valve with respect to a plurality of batteries is not so high.

In the easy-open can (hereinafter, referred to as an EOE can) disclosed in Patent Document 4 and Patent Document 5, a structure of the can lid is different from that of a portion of the battery can which is provided with a safety valve, and particularly, a can opening mechanism itself is completely different from a mechanism of the battery can provided with the safety valve.

That is, in Patent Document 4 and Patent Document 5, a large force is caused to operate on a local point of a score contour by a tab that functions as a lever, the one local point of the score contour is opened, and then the majority of the score contour is opened by pushing force of the tab. In this manner, in Patent Document 4, a can lid having a mechanical opening function is used. Accordingly, with regard to a mechanical function of opening a can and can opening characteristics that are necessary, the can lid is basically different from the battery can provided with the safety valve.

A difference between a can opening technology in the field of beverage can, and a valve opening technology of the battery can will be described below.

The safety valve of the battery can is reliably opened at a point of time at which inner pressure generated during charging reaches a predetermined designed inner pressure, and the battery can itself is prevented from being ruptured. When the designed inner pressure of the safety valve is too high, the battery inner pressure increases too much, and thus the battery can is apt to be ruptured. On the other hand, when the designed inner pressure of the safety valve is too low, the safety valve is opened during charging, and thus an assembled battery itself is broken. Accordingly, it is necessary to limit the upper limit of an amount of charge, and thus the performance of the assembled battery is greatly limited.

On the other hand, the beverage can uses a method (a technical field in which a can opening mechanism is completely different from a mechanism of the safety valve of the battery can) in which force is focused on one point of the score portion by a component called a tab functioning as a lever to allow large force to operate so as to open the can. Accordingly, performance necessary for this method (that is, performance of the beverage can) includes durability against an impact, easiness of can opening, and mass productivity. With regard to the durability against an impact, for example, even when a can into which contents are put is dropped several times at a height of approximately 1 m, it is necessary for the durability to have a level at which a score portion is not opened by deformation of the can due to the dropping and the contents do not flow out. This level is sufficiently lower than a level necessary for the battery can, and thus a remaining score thickness (Min value) may be made to be small to the limit of a level necessary for the durability against an impact. In addition, with regard to the easiness of the can opening, it is necessary to set the upper limit of can opening power to a remaining score thickness level capable of being opened by the tip of a finger of human. The can opening power has a variation depending on kinds of cans, makers, and the like, and has a large margin within a setting range of the can opening power (a technical field having a margin for the setting of the remaining score thickness). Accordingly, in the beverage can, the can opening power may vary in an individual beverage can, and it is not necessary to increase the processing accuracy to a certain degree of the battery can to increase mass productivity.

In addition, with regard to the safety valve of the battery can, it is necessary for the score portion of the safety valve not to be fatigue-broken under conditions in which large inner pressure is repetitively applied to the battery can at all times over 10 to 15 years, and it is necessary for the safety valve to be opened at a point of time at which inner pressure set as valve opening pressure is loaded. On the other hand, in the beverage can, the repetitive load itself is not present. Accordingly, the technical field of the beverage can is a technical field in which it is not necessary to consider fatigue strength to which the present inventors give attention.

Accordingly, the technology of the beverage can does not have the same technical idea as the battery can which endures a repetitive stress load over a long period of time, and which is reliably opened at a point of time at which a predetermined loaded inner pressure is applied.

Also, as disclosed in Patent Document 5, in a case where the bottom of the score groove has a curvature, large can-opening-power is necessary, and thus can opening properties decrease. Accordingly, in this case, it is necessary to extremely decrease the remaining score thickness.

In addition, in the safety valve of the battery can, it is necessary for the valve opening pressure itself not to be too much lower than a set value, and not to be too much higher than the set value, that is, it is necessary for a variance in an absolute value of the valve opening pressure of a number of battery cans to be small. Furthermore, since an assembled battery is designed in such a manner that the valve opening pressure is common to all of assembled batteries that are produced, it is necessary for individual battery cans used in all of the assembled batteries to have a small variance in the valve opening pressure of the safety valve of the battery can. As mentioned above, with regard to the battery can, accuracy (reproducibility) of the safety valve of the individual battery can is a very important technical field. However, the beverage can belongs to a technical field having no such technical idea.

As mentioned above, the valve opening technology of the battery can is completely different from the can opening technology of the beverage can.

PRIOR ART DOCUMENT

Patent Document

[Patent Document 1] Japanese Unexamined Patent Application, First Publication No. S59-79965
[Patent Document 2] Japanese Registered Utility Model No. 2585726
[Patent Document 3] Japanese Patent No. 4346637
[Patent Document 4] Japanese Patent No. 3893198
[Patent Document 5] Japanese Unexamined Patent Application, First Publication No. 2000-233247

DISCLOSURE OF THE INVENTION

Problem that the Invention is to Solve

The invention is to provide a battery can for a storage battery (particularly, for an industrial use and an in-vehicle use) which is provided with a safety valve in which a variance in valve opening pressure of a score groove portion of an individual battery can is small, and the valve opening pressure of the score groove portion scarcely decreases by deterioration of the battery can with the passage of time (for example, over 10 to 15 years) due to fatigue or corrosion. Accordingly, the problem of the battery can for a storage battery is completely different from the technical problem disclosed in the prior art documents.

Means for Solving the Problems

To provide a battery can in which the above-described problem is solved, the present inventors have made various examinations on a mechanical function of stably opening the battery can, and valve opening characteristics necessary for valve opening, and they have accomplished the invention. The gist of the invention is as follows.

(1) According to a first aspect of the invention, there is provided a battery can for a storage battery. The battery can includes a tubular can body portion having a first end and a second end, a can bottom portion that is continuous to the can body portion so as to cover the first end of the can body portion, and a can lid portion that is continuous to the can body portion so as to cover the second end of the can body portion when constituting a battery. A safety valve having a first score groove portion and a second score groove portion that are opposite to each other in a cross-sectional view in a sheet thickness direction is provided to an inner surface and an outer surface of any one of the can bottom portion, the can body portion, and the can lid portion. When viewed from a cross-section that is perpendicular to an extension direction of the first score groove portion, the first score groove portion and the second score groove portion have a first score groove bottom portion and a second score groove bottom portion, which have a radius of curvature R and a relative clearance of 0.045 mm to 0.150 mm, respectively. The radius of curvature R is more than 0.20 mm and is equal to or less than 1.20 mm. Any one of the can bottom portion, the can body portion, and the can lid portion, which has the safety valve, is constituted by a plated steel sheet having a steel sheet portion in which the content of C is limited to 0.040% by mass or less and the content of S is limited to 0.020% by mass or less, and tensile strength TS is 400 MPa or less, and a plate layer formed on the steel sheet portion.

(2) In the battery can for a storage battery according to (1), the plated steel sheet may be subjected to score processing by a press forming method.

(3) In the battery can for a storage battery according to (1), after the steel sheet portion is subjected to the score processing by the press forming method, the plated layer may be formed on a surface of the steel sheet portion.

(4) According to a second aspect of the invention, there is provided a battery can for a storage battery. The battery can includes a tubular can body portion having a first end and a second end, a can bottom portion that is continuous to the can body portion so as to cover the first end of the can body portion, and a can lid portion that is continuous to the can body portion so as to cover the second end of the can body portion when constituting a battery. A safety valve having a first score groove portion and a second score groove portion that are opposite to each other in a cross-sectional view in a sheet thickness direction is provided to an inner surface and an outer surface of any one of the can bottom portion, the can body portion, and the can lid portion. When viewed from a cross-section that is perpendicular to an extension direction of the first score groove portion, the first score groove portion and the second score groove portion have a first score groove bottom portion and a second score groove bottom portion, which have a radius of curvature R and a relative clearance of 0.055 mm to 0.150 mm, respectively. The radius of curvature R is 0.30 mm to 1.20 mm. Any one of the can bottom portion, the can body portion, and the can lid portion, which has the safety valve, is constituted by a plated steel sheet having a steel sheet portion in which the amount of C is limited to 0.100% by mass or less and the amount of S is limited to 0.030% by mass or less, and tensile strength TS is 400 MPa or less, and a plate layer formed on the steel sheet portion.

(5) In the battery can for a storage battery according to (4), the plated steel sheet may be subjected to score processing by a press forming method.

(6) In the battery can for a storage battery according to (5), after the steel sheet portion is subjected to the score processing by the press forming method, the plated layer may be formed on a surface of the steel sheet portion.

(7) In the battery can for a storage battery according to any one of (1) to (6), the plated layer may be Ni plating.

(8) In the battery can for a storage battery according to any one of (1) to (3), the radius of curvature R may be 0.30 mm to 1.20 mm.

(9) In the battery can for a storage battery according to (8), the plated layer may be Ni plating.

(10) According to a third aspect of the invention, there is provided a battery can for a storage battery. The battery can includes a tubular can body portion having a first end and a second end, a can bottom portion that is continuous to the can body portion so as to cover the first end of the can body portion, and a can lid portion that is continuous to the can body portion so as to cover the second end of the can body portion when constituting a battery. A safety valve having a first score groove portion and a second score groove portion that are opposite to each other in a cross-sectional view in a sheet thickness direction is provided to an inner surface and an outer surface of any one of the can bottom portion, the can body portion, and the can lid portion. When viewed from a cross-section that is perpendicular to an extension direction of the first score groove portion, the first score groove portion and the second score groove portion have a first score groove bottom portion and a second score groove bottom portion, which have a radius of curvature R and a relative clearance of 0.045 mm to 0.150 mm, respectively. The radius of curvature R is more than 0.20 mm and is equal to or less than 1.20 mm. Any one of the can bottom portion, the can body portion, and the can lid portion, which has the safety valve, is constituted by a stainless steel sheet in which the amount of C is limited to 0.040% by mass or less and the amount of S is limited to 0.020% by mass or less, and tensile strength TS is 400 MPa or less.

(11) In the battery can for a storage battery according to (10), the stainless steel sheet may be subjected to score processing by a press forming method.

(12) In the battery can for a storage battery according to (10) or (11), the radius of curvature R may be 0.30 mm to 1.20 mm.

Advantage of the Invention

According to the aspects of the invention, it is possible to provide a battery can for a storage battery which is provided with a safety valve in which a variance in valve opening pressure of a score groove portion of an individual battery can is small, and the valve opening pressure of the score groove portion scarcely decreases by deterioration of the battery can with the passage of time (for example, over 10 to 15 years) due to fatigue or corrosion. Accordingly, an industrial value is significantly high.

Particularly, in the battery can for a storage battery according to (1) to (12), a decrease in the valve opening pressure of the score groove portion by fatigue caused by a repetitive variation in inner pressure (repetitive stress) which is loaded on the battery can over a long period of time (10 to 15 years) may be effectively suppressed.

In addition, in the battery can for a storage battery according to (1) to (9), a decrease in the valve opening pressure of the score groove portion, which is caused by pitting or the like of the score groove portion in the anticorrosive plated steel sheet having a plate layer such as Ni plating, may be effectively suppressed.

BEST MODE FOR CARRYING OUT THE INVENTION

Hereinafter, the invention will be described in detail.

The present inventors have carried out an examination on a score groove type safety valve of a battery can for a storage battery (particularly, for an industrial use and an in-vehicle use) in which a variance in valve opening pressure of a score groove portion of an individual battery can is small, and the valve opening pressure of the score groove portion scarcely decreases by deterioration of the battery can with the passage of time due to fatigue or corrosion. Here, the decrease in the valve opening pressure of the score groove portion by the deterioration of the battery can with the passage of time due to fatigue is caused by a repetitive variation in inner pressure (repetitive stress) which is loaded on the battery can over a long period of time (10 to 15 years). In addition, the decrease in the valve opening pressure of the score groove portion by the deterioration of the battery can with the passage of time due to corrosion is caused by pitting or the like of the score groove portion in the anticorrosive plated steel sheet having a plate layer such as Ni plating.

The present inventors have carried out the following examination, and they have found that it is possible to provide a battery can for a storage battery with a satisfactory score groove type safety valve.

First, the present inventors have carried out various examinations on a cause of a variance in valve opening pressure of the score groove portion of an individual battery can, and they have found the following (1-a) to (1-e) with respect to the score groove portion capable of reducing the variance in the valve opening pressure.

Figure 7A:
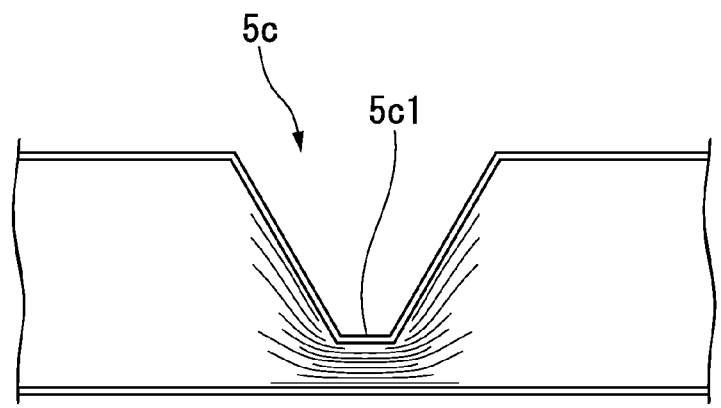
FIG. 7A is an explanatory diagram illustrating stress concentration in a case of forming a trapezoidal score groove by press working.

(1-a) In a trapezoidal blade edge and a triangular blade edge, for example, as shown in FIG. 7A, strain is focused on a local point. Therefore, the shape of the blade edge has a great effect on the degree and distribution of an amount of process strain in the vicinity of a score groove bottom portion 5c1 processed by the distal portion of the blade edge. Accordingly, the degree and distribution of the process strain in the vicinity of the score groove bottom portion 5c1 greatly vary due to a variance in the shape of the blade edge (for example, a variance in the shape of the blade edge for each tool (the blade edge)). As a result, the valve opening pressure of the score groove portion 5c of an individual battery can greatly varies.

Furthermore, the distal portion of the blade edge has a corner, and thus the blade edge is abraded due to repetitive score processing, and the shape of the blade edge has a tendency to vary. Accordingly, due to a variance in the shape of the blade edge, the valve opening pressure has a tendency to vary.

In addition, even when the blade edge has an arc shape, when a radius of curvature R of the score groove bottom portion (hereinafter, referred to as a radius of curvature R) is 0.20 mm or less, the blade edge has a tendency to be abraded during the score processing, and thus the valve opening pressure has a tendency to vary.

In addition, when the radius of curvature R exceeds 1.20 mm, an amount of metal flow, which occurs when a worked portion of the can is extruded due to the formation of a score groove during the score processing, increases too much. Accordingly, strain occurs on a surface which is subjected to the score processing, and thus the valve opening pressure varies.

As described above, to sufficiently suppress the variance of the valve opening pressure, the radius of curvature R is set to be more than 0.20 mm and equal to or less than 1.20 mm. In addition, when the radius of curvature R is within a range of more than 0.20 mm and 1.20 mm or less, even when the radius of curvature R of an inner surface of the can and the radius of curvature R of an outer surface of the can are not equal to each other, the variance in the valve opening pressure may be sufficiently suppressed. In a case of further suppressing the abrasion of the blade edge to further reliably suppress the variance in the valve opening pressure, it is preferable that the radius of curvature R be 0.30 mm or more.

(1-b) From results of comparison between a double-sided score and a single-sided score, it can be seen that there is a difference in the variance of the valve opening pressure. In the double-sided score, the maximum amount of strain in the vicinity of the score groove bottom portion is reduced, and thus nonuniformity of the score groove portion may be improved, and the variance in the valve opening pressure may be sufficiently suppressed. However, in the single-sided score, the above-described characteristics of the score groove portion may not be improved, and thus the suppression of the variance in the valve opening pressure is not sufficient. Accordingly, in addition to the setting of the radius of curvature R to more than 0.20 mm and 1.20 mm or less, the score groove portion is made to be present in both the inner surface and the outer surface of the can.

Figure 7B:
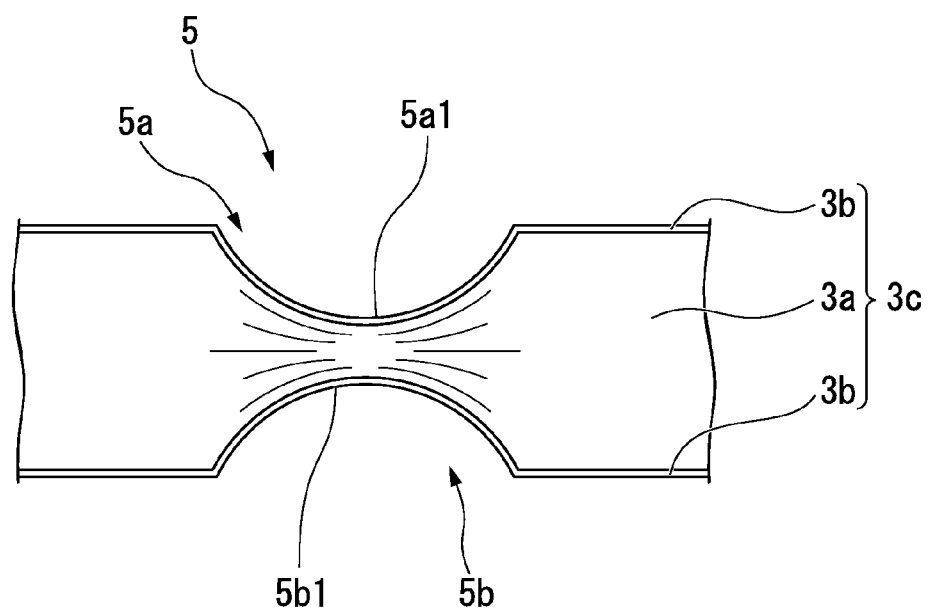
FIG. 7B is an explanatory diagram illustrating stress dispersion in a case of forming an arc-shaped score groove by the press working.

(1-c) Furthermore, for example, as shown in FIG. 7B, when the radius of curvature R in the double-sided score is set to be more than 0.20 mm, not only the amount of strain in the vicinity of the score groove bottom portions 5a1 and 5b1 may be reduced due to dispersed stress, but also a variation rate (deterioration with the passage of time) of the radius of curvature R of the blade edge due to abrasion of the blade edge is suppressed. Accordingly, the lifespan of the blade edge of a die may be increased. In addition, when the radius of curvature R exceeds 0.20 mm, since a change of the valve opening pressure due to a change of the radius of curvature R is small, a change (variance) of the valve opening pressure due to the abrasion of the blade edge of the die scarcely occurs.

In FIGS. 7A and 7B, to illustrate a stress state in an easily understandable manner, hatching of a cross-section is omitted.

(1-d) In a steel sheet used in the battery can, when the amount of C is limited to 0.040% by mass or less, the amount of S is limited to 0.020% by mass or less, and tensile strength TS is limited to 400 MPa or less, defects inside the steel sheet which occur due to score processing strain are reduced, and thus a decrease in ductility of ferrite may be suppressed. Examples of the defects inside the steel sheet include a cavity that may be formed at a boundary between $Fe_3C$ and MnS, and ferrite, or a microcrack that occurs due to a hard characteristic of the steel sheet itself. In addition, in a steel sheet in which a decrease in ductility of ferrite due to the score processing is suppressed, when the radius of curvature R of the double-sided score exceeds 0.20 mm, even when the remaining score thickness d is made as small as 0.045 mm, stable valve opening pressure may be obtained. Accordingly, the remaining score thickness d may be made as small as 0.045 mm. Thus, the battery can is applicable to a use in which relatively low valve opening pressure is necessary. Particularly, to obtain more stable valve opening pressure after making the remaining score thickness d as small as possible, it is preferable that the radius of curvature R of the double-sided score be 0.30 mm or more.

(1-e) On the other hand, in a case of providing a score groove type safety valve in which the radius of curvature R is 0.30 mm to 1.20 mm, and the remaining score thickness d is 0.055 mm to 0.150 mm, microcracks that occur in the vicinity of the score groove bottom portion may be greatly reduced. Thereby, when the score groove portion is formed in such a manner that the radius of curvature R becomes 0.30 mm or more, and the remaining score thickness d becomes 0.055 mm or more, with regard to a component composition of the steel sheet, the amount of C may be reduced to 0.100% by mass or less and the amount of S may be reduced to 0.030% by mass or less, and with regard to strength characteristics of the steel sheet, the tensile strength TS may be mitigated to 400 MPa or less.

In addition, when the remaining score thickness d exceeds 0.150 mm, the valve opening pressure becomes too high, and thus the safety valve does not appropriately function as a safety valve of a storage battery for an industrial use and an in-vehicle use.

Next, with regard to suppression of a decrease in the valve opening pressure of the score groove portion by deterioration of the battery can with the passage of time due to fatigue, the present inventors have found the following (2-a) to (2-e).

(2-a) In a score groove portion that is subjected to the score processing with a trapezoidal blade edge and a triangular blade edge, inner pressure is repetitively focused on a surface of the score groove portion, and as a result, fatigue breaking occurs at low inner pressure. Furthermore, in the case of a trapezoidal score or a triangular score, since large process strain is applied to the vicinity of the score groove bottom portion formed by the blade edge, microcracks occur at the periphery of the inclusions and the like in the steel sheet, and propagation of fatigue cracks becomes fast, and thus fatigue-resistant strength greatly deteriorates. In a score groove portion in which the radius of curvature R is more than 0.20 mm and equal to or less than 1.20 mm, stress is not focused too much on a local point of the score groove portion, and thus the fatigue-resistant strength of the score groove portion increases, and thus the fatigue breaking is not likely to occur. Accordingly, to secure very good fatigue-resistant characteristics against a load caused by a variation of inner pressure over a long period of time, the radius of curvature R of the score groove portion is set to be more than 0.20 mm and equal to or less than 1.20 mm. In a case of further improving the fatigue resistance, it is preferable that the radius of curvature R be 0.30 mm or more.

(2-b) In the double-sided score, since severe process strain is dispersed to both surfaces of the steel sheet during the score processing, microcracks may be greatly reduced during the score processing, and thus the fatigue characteristics may be further improved.

(2-c) When the radius of curvature R in the double-sided score is set to be more than 0.20 mm and equal to or less than 1.20 mm, local stress serving as an origin of fatigue is greatly mitigated, and thus the fatigue resistance is improved.

(2-d) In a case where the radius of curvature R of the score groove bottom portion is more than 0.20 mm and equal to or less than 0.30 mm, and the remaining score thickness d is 0.045 mm to 0.055 mm, when all conditions, in which the amount of C in the steel sheet is 0.040% by mass or less, the amount of S in the steel sheet is 0.020% by mass or less, and the tensile strength TS of the steel sheet is 400 MPa or less, are not satisfied, microcracks that occur at a boundary between $Fe_3C$ and MnS, and ferrite may not be reduced. In this case, a fatigue propagation velocity is high, and fatigue-resistant characteristics deteriorate, and thus the valve opening pressure of the safety valve decreases along with an operation time of the battery. Accordingly, in a case where the radius of curvature R is more than 0.20 mm and equal to or less than 0.30 mm, and the remaining score thickness is 0.045 mm to 0.055 mm, the amount of C in the steel sheet is limited to 0.040% by mass or less, the amount of S in the steel sheet is limited to 0.020% by mass or less, and the tensile strength TS of the steel sheet is limited to 400 MPa or less.

(2-e) On the other hand, in a case of providing a score groove type safety valve in which the radius of curvature R is 0.30 mm to 1.20 mm, and the remaining score thickness is 0.055 mm to 0.150 mm, microcracks that occur in the vicinity of the score groove bottom portion may be greatly reduced. Thereby, when the score groove portion is formed in such a manner that the radius of curvature R becomes 0.30 mm or more, and the remaining score thickness d becomes 0.055 mm or more, with regard to a component composition of the steel sheet, the amount of C may be reduced to 0.100% by mass or less and the amount of S may be reduced to 0.030% by mass or less, and with regard to strength characteristics of the steel sheet, the tensile strength TS may be mitigated to 400 MPa or less.

Next, with regard to suppression of a decrease in the valve opening pressure of the score groove portion by deterioration of the battery can with the passage of time due to corrosion, the present inventors have found the following results (3-a) to (3-c).

(3-a) In a score groove portion that is subjected to the score processing with a trapezoidal blade edge and a triangular blade edge, process strain is focused on a local point of the score groove portion, and as a result, strong shear strain occurs at a Ni plate layer, and the Ni plate layer is partially broken due to the shear strain. Accordingly, pitting progresses from the broken portion of the Ni plated layer. On the other hand, when using a circular blade edge capable of forming a score groove portion in which the radius of curvature R is more than 0.20 mm and is equal to or less than 1.20 mm, the partial breakage of the plated layer due to shearing may be suppressed. Accordingly, the decrease in the valve opening pressure in the Ni plated layer of the score groove portion due to pitting or the like may be sufficiently suppressed.

(3-b) In the double-sided score, an amount of the process strain of the Ni plated layer is greatly reduced, and thus the soundness of the Ni plated layer is further improved.

(3-c) When the radius of curvature R in the double-sided score is set to be more than 0.20 mm, local strain during the score processing is mitigated, and thus the soundness of the Ni plated layer is improved and pitting is suppressed. Accordingly, satisfactory fatigue resistance may be obtained. Furthermore, when the radius of curvature R becomes 0.30 mm or more, a safety valve in which more satisfactory soundness of the Ni plated layer and more satisfactory fatigue-resistant characteristics are secured may be obtained.

In addition, in the battery can for a storage battery, when a soft stainless steel sheet in which the amount of C is limited to 0.040% by mass or less, the amount of S is limited to 0.020% by mass or less, and the tensile strength TS is limited to 400 MPa or less is used for the battery can, it is not necessary to consider the findings of (3-a) to (3-c). However, in consideration of the findings of (1-a) to (1-e), and (2-a) to (2-e), a battery can is configured to be provided with the score groove type safety valve having the score groove portion, in which the radius of curvature R is more than 0.20 mm and equal to or less than 1.20 mm, and the remaining score thickness d is 0.045 mm to 0.150 mm, on both surfaces of the stainless steel sheet. In this case, it is possible to provide a battery can for a storage battery in which the local stress serving as an origin of fatigue is greatly mitigated, and which is satisfactory in stability of the valve opening pressure, valve opening characteristics, fatigue resistance, and corrosion resistance under a harsh environment.

Here, a portion of the battery can, to which the double-sided score processing type safety valve is provided, is not particularly limited, and may be a can lid flat portion (can lid portion), a can bottom flat portion (can bottom portion), or a can side wall portion (can body portion) as long as the double-sided score may be formed.

Figure 1:
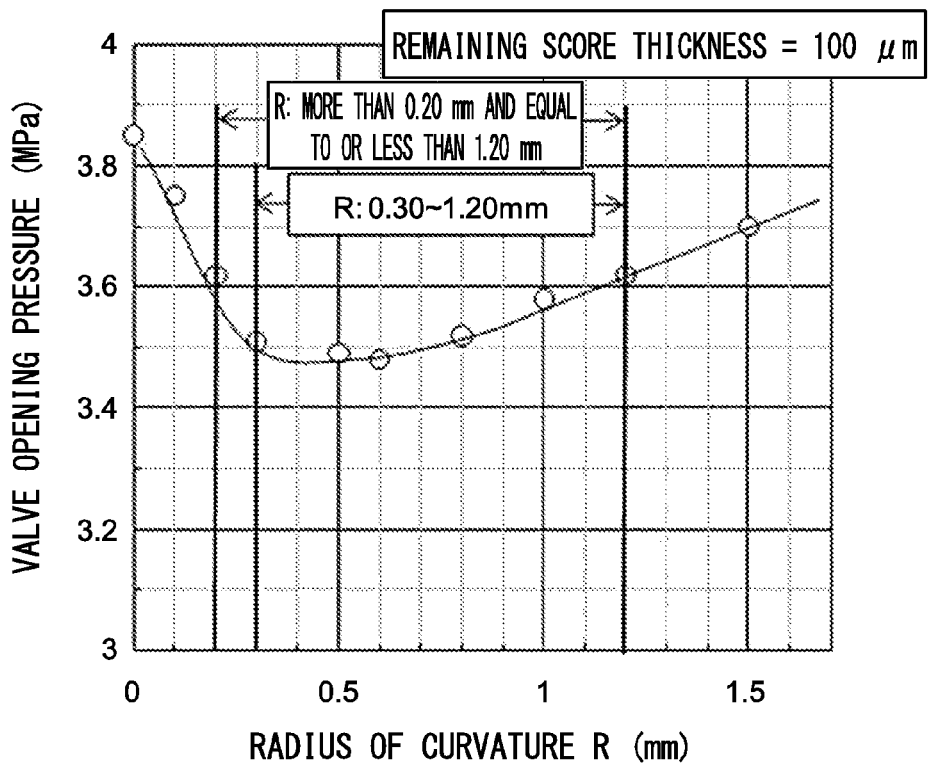
FIG. 1 is a graph illustrating a relationship between a radius of curvature R and valve opening pressure.
Figure 2:
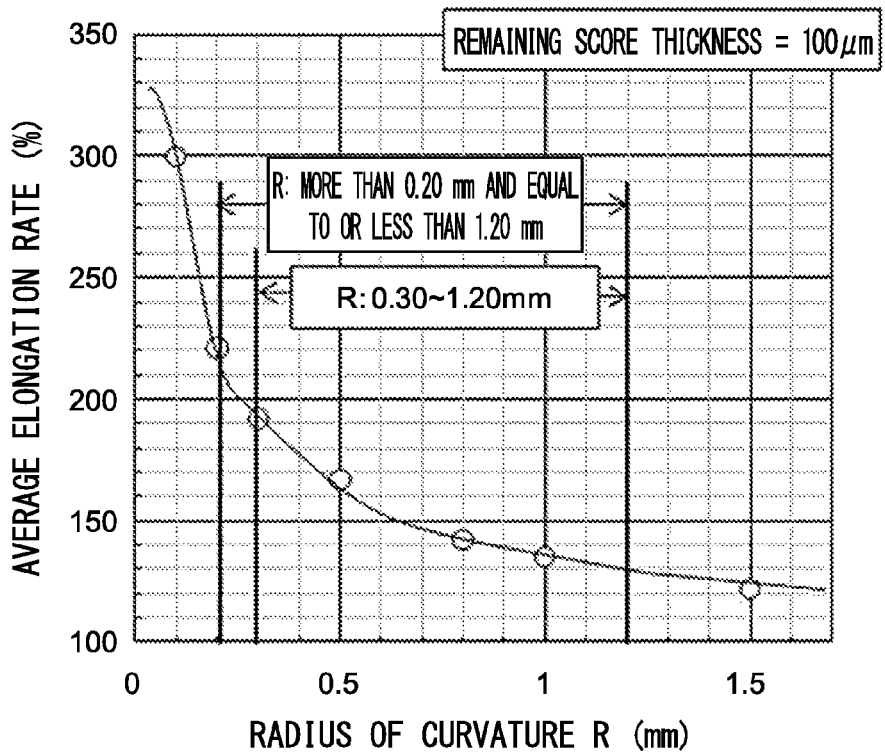
FIG. 2 is a graph illustrating a relationship between the radius of curvature R and an index of soundness of a Ni plated layer (average elongation rate of the Ni plated layer).

FIG. 1 shows a relationship between the radius of curvature R and the valve opening pressure, and FIG. 2 shows a relationship between the radius of curvature R and an index of soundness of a Ni plated layer (average elongation rate of the Ni plated layer). In FIGS. 1 and 2, characteristics of the safety valve are evaluated by the following method.

A Ni plated steel sheet (sheet thickness=0.50 mm) in which the amount of C is 0.002% by mass, the amount of S is 0.007% by mass, and the tensile strength TS is 310 MPa is drawn to prepare a cylindrical can (a can body portion and a can bottom portion). A score having curvature (roundness) at a front end (score groove bottom portion) with a score contour $\phi$ of 25.5 mm is formed in both a front surface and a rear surface of the can bottom (can bottom portion) of the cylindrical can to prepare a safety valve in which the remaining score thickness is 100 µm. Then, a can lid (can lid portion) is attached to the cylindrical can, and then the resultant battery can is sealed. Inner pressure is loaded to the battery can to open the valve, and the relationship between the radius of curvature R and the valve opening pressure is examined. In addition, in a case where the radius of curvature R is 0 mm (that is, a triangular score), elongation of the Ni plated layer is focused on a local point too much, and thus an average elongation rate of the Ni plated layer may not be evaluated. Here, the average elongation rate ΔL of the Ni plated layer is evaluated by the following expression (Expression 1) after observing a cross-sectional structure of the score-processed score groove portion to measure an original line length L0 of the Ni plated layer which corresponds to the score groove portion before the score processing, and a line length L1 of the Ni plated layer which corresponds to the score groove portion after the score processing.

$$\Delta L = (L1-L0)/L0 \times 100 \quad \text{(Expression 1)}$$

As shown in FIG. 1, when the radius of curvature R is changed from zero (triangular score) to 0.2 mm, the valve opening pressure significantly decreases, and when the radius of curvature R reaches 0.3 mm, the valve opening pressure decreases to the lowest loaded inner pressure level, and satisfactory valve opening characteristics may be obtained. When the radius of curvature R is 0.3 mm to 1.0 mm, stable valve opening characteristics at the minimum valve opening pressure may be obtained, and thus this radius of curvature R is more preferable. When the radius of curvature R is 1.0 mm to 1.2 mm, the valve opening pressure gradually increases along with an increase in the radius of curvature R, and when the radius of curvature R reaches 1.2 mm, the valve opening pressure reaches an appropriate limit. When the radius of curvature R exceeds 1.2 mm, the valve opening pressure rapidly increases along with an increase in the radius of curvature R.

Furthermore, the present inventors have found that a relationship between the radius of curvature R and the valve opening pressure as shown in FIG. 1 has the same tendency as a relationship between the radius of curvature R and stability of the valve opening pressure, and a relationship between the radius of curvature R and fatigue strength.

A relationship between an average elongation rate of the Ni plated layer and the radius of curvature R, which has a great effect on the soundness of the Ni plated layer, is shown in FIG. 2. When the radius of curvature R is within a range of more than 0 and 0.2 mm or less, the average elongation rate of the Ni plated layer is significantly reduced, and when the radius of curvature R exceeds 0.2 mm, the average elongation rate of the Ni plated layer sufficiently decreases, and thus the soundness of the Ni plated layer may be secured. When the radius of curvature R further increases, the average elongation rate of the Ni plated layer gradually decreases, and thus the soundness of the Ni plated layer is improved. In addition, when the soundness of the Ni plated layer is improved, the pitting of the Ni plated layer may be decreased, and thus an abnormal decrease in the valve opening pressure due to the pitting is not likely to occur. Accordingly, the durability of the battery can itself is also improved. Also, when the radius of curvature R is 0.3 mm or more, the average elongation rate of the Ni plated layer may be reduced by 200% or less, and thus the radius of curvature R is more preferably 0.3 mm or more.

Hereinafter, a battery can for a storage battery (hereinafter, referred to simply as "battery can") according to an embodiment of the invention will be described in detail. In addition, in the specification and drawings, the same reference numerals will be given to components having substantially the same functional configuration, and a redundant description thereof will be omitted here.

Figure 3A:
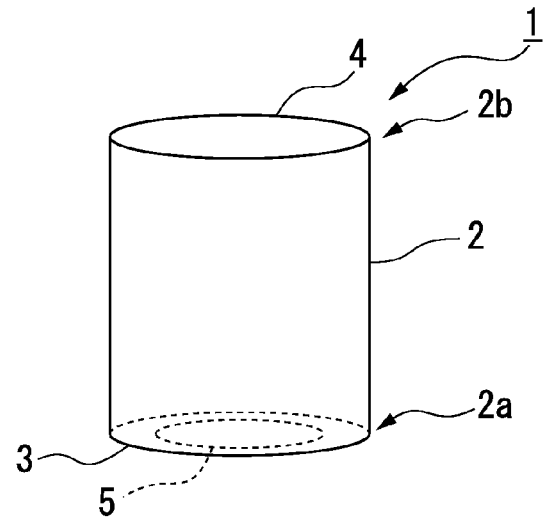
FIG. 3A is a schematic perspective diagram illustrating a battery can according to an embodiment of the invention.

FIG. 3A shows a schematic perspective diagram of the battery can according to the embodiment. As shown in FIG. 3A, the battery can 1 includes a tubular can body portion 2 having two ends 2a and 2b (a first end 2a and a second end 2b), a can bottom portion 3 that is continuous to the can body portion 2 so as to cover the end 2a of the can body portion 2, and a can lid portion 4. In the battery can 1, when a battery is assembled, the battery can 1 seal the battery in such a manner that the can lid portion 4 is provided to be continuous to the can body portion 2 so as to cover the end 2b of the can body portion 2 as shown in FIG. 3A.

Besides, as shown in FIG. 3A, the battery can 1 includes a score groove type safety valve 5 at the can bottom portion 3. In a case where the battery is configured using the battery can 1, and pressure inside the battery can 1 is abnormally raised, the safety valve 5 is opened to prevent the battery can itself from being ruptured.

Figure 4:
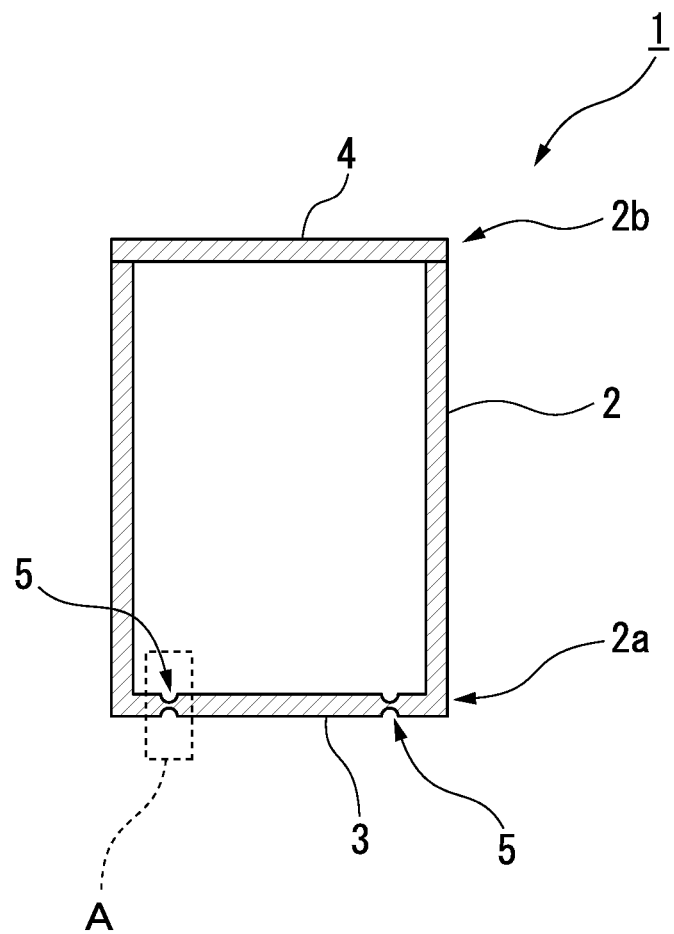
FIG. 4 is a schematic longitudinal cross-sectional diagram of the battery can according to the embodiment.
Figure 5A:
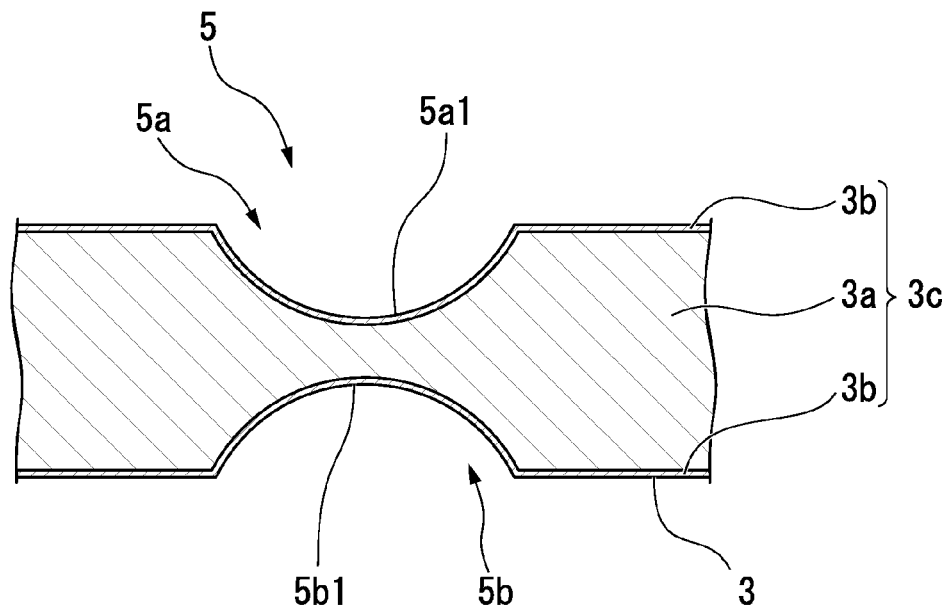
FIG. 5A is a schematic partial cross-sectional diagram illustrating an example of a score groove portion of the battery can according to an embodiment of the invention.

FIG. 4 shows a schematic longitudinal cross-sectional diagram of the battery can according to the embodiment, which is cut to pass through the central axis of the battery can 1 shown in FIG. 3A. Also, FIG. 5A shows a partial schematic diagram illustrating an enlarged view of broken-line portion A in FIG. 4. As shown in FIG. 5A, the safety valve 5 is constituted by a score groove portion 5a (first score groove portion 5a) in an inner surface of the can bottom portion 3, and a score groove portion 5b (second score groove portion 5b) in an outer surface of the can bottom portion 3. In this manner, the safety valve 5 includes the score groove portions 5a and 5b in the inner surface and the outer surface of the can bottom portion 3, and the score groove portions 5a and 5b are disposed to be opposite to each other in a cross-section view in a sheet thickness direction (that is, in a groove depth direction). In addition, when viewed from a cross-section that is perpendicular to an extension direction (a direction perpendicular to a groove width direction and the groove depth direction) of the score groove portions 5a and 5b, the score groove portions 5a and 5b have score groove bottom portions 5a1 and 5b1 which have a radius of curvature R. Besides, here, a groove shape that faces to the extension direction of the score groove portions 5a and 5b is the same in each case.

In addition, the can bottom portion 3 provided with the safety valve 5 (that is, a portion provided with the safety valve) is formed from a plated steel sheet 3c having a steel sheet portion 3a (an original sheet portion for plating) in which the amount of C and the amount of S that is an unavoidable impurity are limited, and which has a tensile strength TS, and plated sheets 3b on a surface of the steel sheet portion 3a. In this case, the radius of curvature R and a range of a distance (that is, remaining score thickness) d between the score groove bottom portions 5a1 and 5b1 are determined in accordance with the amount of C and the amount of S, and the tensile strength TS of the steel sheet portion 3a.

With regard to the steel sheet portion 3a of the can bottom portion 3 which is provided with the safety valve 5, in a case where the amount of C is limited to 0.040% by mass or less, the amount of S is limited to 0.020% by mass or less, and the tensile strength TS is 400 MPa or less, the radius of curvature R is more than 0.20 mm and equal to or less than 1.20 mm, and preferably 0.30 mm to 1.20 mm. In addition, in this case, the remaining score thickness d is 0.045 mm to 0.150 mm.

Here, to secure strength necessary for the battery, for example, the steel sheet portion 3a may contain 0.0010% to 0.040% of C. Besides, to reduce the production cost of the plated steel sheet 3c by reducing the refining cost of the steel sheet portion 3a, the steel sheet portion 3a may contain 0.0005% to 0.020% of S.

With regard to the steel sheet portion 3a of the can bottom portion 3 which is provided with the safety valve 5, in a case where the amount of C is limited to 0.100% by mass or less, the amount of S is limited to 0.030% by mass or less, and the tensile strength TS is 400 MPa or less, the radius of curvature R is more than 0.30 mm and equal to or less than 1.20 mm. In addition, in this case, the remaining score thickness d is 0.055 mm to 0.150 mm.

Here, to secure strength necessary for the battery, for example, the steel sheet portion 3a may contain 0.0010% to 0.100% of C. Besides, to reduce the production cost of the plated steel sheet 3c by reducing the refining cost of the steel sheet portion 3a, the steel sheet portion 3a may contain 0.0005% to 0.030% of S.

Also, the lower limit of the tensile strength TS is not particularly limited as long as the lower limit is a strength necessary for a battery that is used, but for example, the lower limit may be 290 MPa.

Furthermore, to lengthen the lifetime of the battery by raising the valve opening pressure as long as a safe and stable battery output is possible even when inner pressure is relatively increased, it is preferable that the remaining score thickness d be 0.060 mm or more, more preferably 0.080 mm or more or 0.085 mm or more, and still more preferably 0.090 mm or more or 0.100 mm or more.

Besides, to further reduce the cost of the battery can by further lengthening the lifetime of a blade edge, it is more preferable that the radius of curvature R be 0.40 mm or more. To further reliably suppress the process strain that may occur by the score processing, it is preferable that the radius of curvature R be 1.00 mm or less.

Figure 5B:
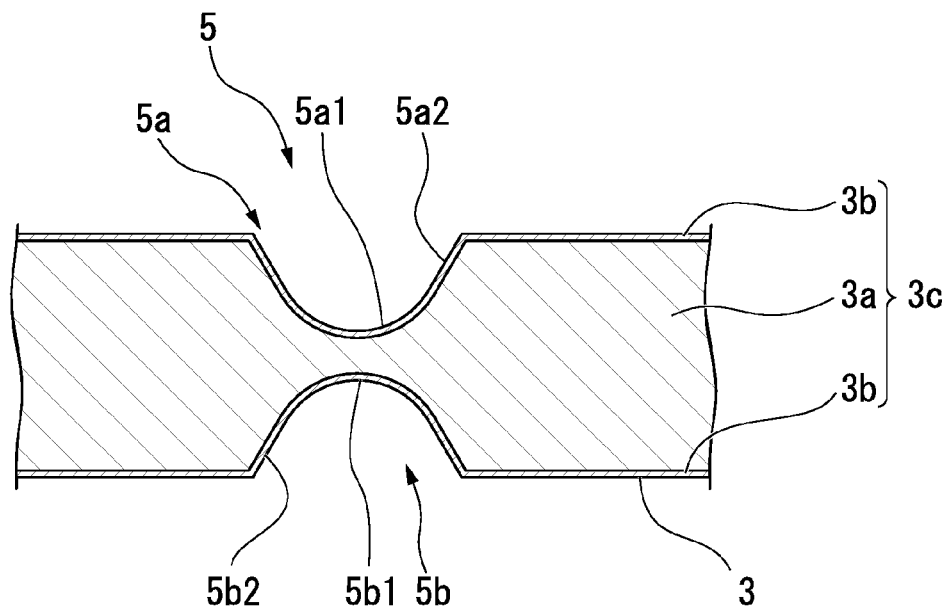
FIG. 5B is a schematic partial cross-sectional diagram illustrating an example of the score groove portion of the battery can according to the embodiment of the invention.
Figure 6A:
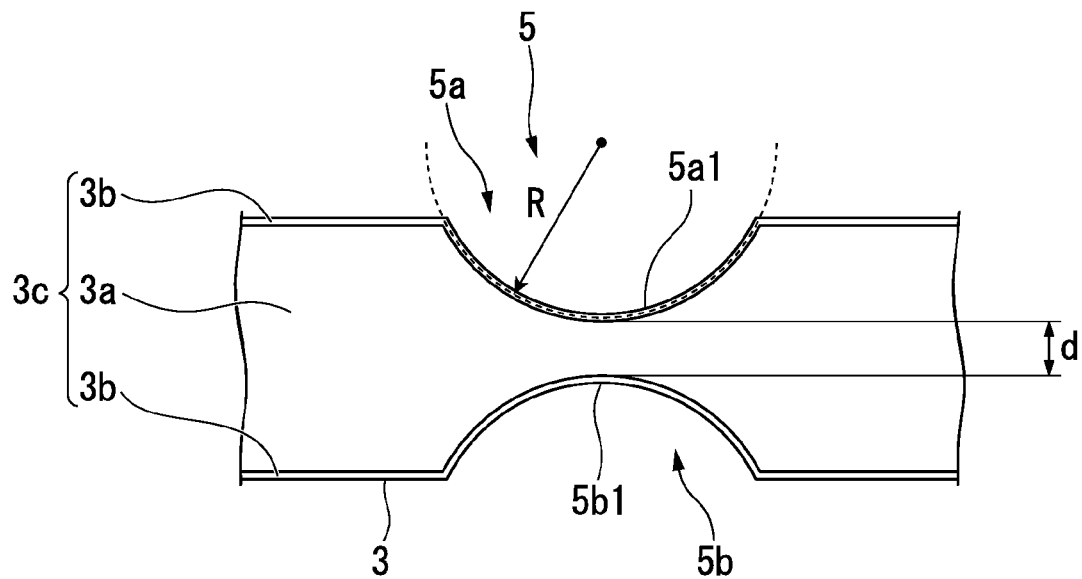
FIG. 6A is an explanatory diagram illustrating a radius of curvature R and a remaining score thickness d in FIG. 5A.
Figure 6B:
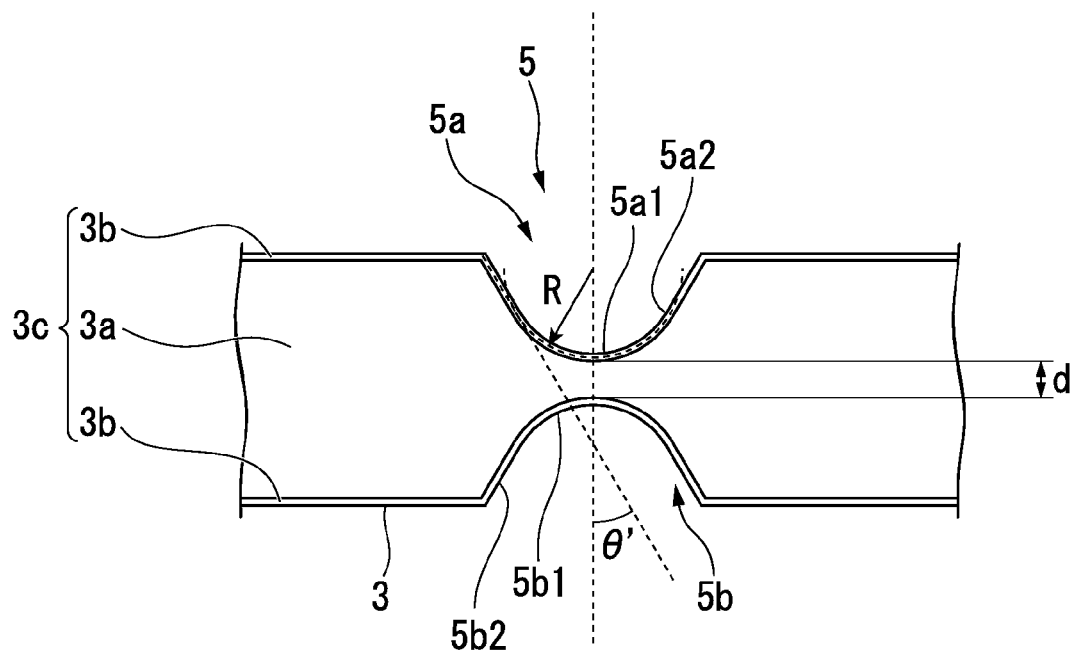
FIG. 6B is an explanatory diagram illustrating a radius of curvature R, a remaining score thickness d, and a groove opening degree θ' in FIG. 5B.

For example, in the embodiment, the score groove bottom portions 5a1 and 5b1 which have the radius of curvature R as shown in FIGS. 5A and 5B may be provided to the bottoms of the score groove portions 5a and 5b, respectively. Here, the radius of curvature R and the remaining score thickness d in FIGS. 5A and 5B are defined as shown in FIGS. 6A and 6B, respectively. In the score groove portions 5a and 5b, the score groove bottom portions 5a1 and 5b1 are portions having the radius of curvature R. Accordingly, in FIG. 5A, the score groove portions 5a and 5b, and the score groove bottom portions 5a1 and 5b1 are consistent with each other. In FIG. 5B. parts of the score groove portions 5a and 5b correspond to the score groove bottom portions 5a1 and 5b1. In FIGS. 6A and 6B, to illustrate each dimension in an easily understandable manner, hatching of a cross-section is omitted.

In a case of FIG. 5A, to make the score processing possible, it is preferable that an angle α (a value of −90° or more and less than 90° in which counter-clockwise rotation with the sheet thickness direction made as a reference is defined as positive rotation) made by a tangential line of each end of the score groove bottom portions 5a1 and 5b1 and a sheet thickness direction (that is, the depth direction of the score groove portion) of the can bottom portion 3 (that is, a portion of the battery can 1 which is provided with the safety valve 5) be 0° or more. In addition, in a case of mitigating the process strain in the vicinity of the score groove portions 5a and 5b as much as possible, the angle α is preferably 45° or less, more preferably 40° or less, and still more preferably 30°. Besides, the score groove shape in FIG. 5A and the score groove shape in FIG. 5B may be changed in accordance with the angle α.

In a case of FIG. 5B, to mitigate the process strain in the vicinity of the score groove portions 5a and 5b, two remaining portions (hereinafter, referred to as score groove upper portions 5a2 and 5b2), which are present on both sides of the score groove bottom portions 5a1 and 5b1, of the score groove portions 5a and 5b preferably have a predetermined angle in an opening direction of the score groove portions 5a and 5b. For example, to mitigate the process strain in the vicinity of the score groove portions 5a and 5b, with regard to the score groove upper portions 5a2 and 5b2 on one side, an angle θ' (hereinafter, referred to as groove opening degree θ')

made by a straight line connecting one end and the other end of the score groove upper portions 5a2 and 5b2, and a sheet thickness direction (that is, the depth direction of the score groove portion) of the can bottom portion 3 (that is, a portion of the battery can 1 which is provided with the safety valve 5) is preferably 20° or more, and more preferably 22.5° or more. In this case, stress that is applied to the Ni plating may be dispersed, and thus the soundness of the Ni plating is improved, and thus the thickness of the Ni plating may be reduced. In a case where the score groove upper portions 5a2 and 5b2 are present, the groove opening degree θ' may be 45° or less or 40° or less to secure continuity between the score groove bottom portions 5a1 and 5b1, and the score groove upper portions 5a2 and 5b2.

In addition, a processing procedure when forming the score groove portions 5a and 5b in the plated steel sheet 3c is not particularly limited, but both prior plating and post plating may be applied to the processing procedure.

That is, the plated steel sheet (corresponding to the plated steel sheet 3c) may be directly subjected to the score processing by a press forming method. In this case, a battery can, which is satisfactory in stability of the valve opening pressure, valve opening characteristics, and soundness of the plated layer 3b, may be provided at a low cost without considering adhesive properties of the plating in the score processed portions.

Besides, the plated layer 3b may be formed on a surface of a steel sheet (corresponding to the steel sheet portion 3a, a steel sheet for post plating) after the steel sheet is subjected to the score processing by a press forming method. In this case, a battery can, which is satisfactory in stability of the valve opening pressure and the valve opening characteristics, may be provided without considering deterioration of corrosion resistance due to the processing.

Moreover, a soft stainless steel sheet (stainless steel sheet having tensile strength of 400 MPa or less) may be used in place of the plated steel sheet 3c. In this case, passivation film on a surface of the stainless steel sheet has the same function as the plated layer 3b, and thus it is not necessary for the surface of the stainless steel sheet to be plated. Accordingly, the stainless steel sheet may be directly subjected to the score processing by the press forming method. In this case, a battery can, which is satisfactory in stability of the valve opening pressure, valve opening characteristics, and corrosion resistance under a harsh environment, may be provided without considering deterioration of corrosion resistance due to processing. In addition, in a case where the soft stainless steel sheet is used, an outermost surface on an inner side of the battery can 1 (the can body portion 2, the can bottom portion 3, and the can lid portion 4) is preferably constituted by the soft stainless steel sheet from the viewpoint of corrosion resistance.

Also, the kind of the plated layer 3b is also not particularly limited, and may be determined in accordance with a material accommodated in the battery (for example, an electrolytic solution) or an operating environment of the battery. For example, it is preferable that the plated layer 3b includes a Ni plated layer having particularly satisfactory corrosion resistance in an organic solvent. In this case, a strike plating that improves plating adhesiveness may be included between the Ni plated layer and the steel sheet portion 3a, and the Ni plated layer may contain components of the strike plating. Particularly, in a case where it is necessary for a surface to have corrosion resistance, or in a case where it is necessary to avoid mixing of impurities into the electrolytic solution, it is preferable that the outermost surface of the plated steel sheet 3c (on an inner side of the battery can 1 (the can body portion 2, the can bottom portion 3, and the can lid portion 4)) be constituted by the Ni plated layer.

Here, in a case of applying the Ni plated steel sheet to the battery can, after Ni plating is performed on a surface of a cold-rolled steel sheet, annealing is preferably performed for softening so as to improve workability of the Ni plated layer and for generation of a Ni—Fe mutual diffusion layer so as to improve adhesiveness in an interface between the Ni plated layer and the steel sheet (iron). In addition, the Ni plated steel sheet is not particularly limited as long as workability during the score processing is secured, and Ni plating of various alloys such as Ni—P, Ni—Sn, and Ni—Cu may be applied. That is, the Ni plated layer or the Ni plated diffusion layer may contain an alloy element such as P, Sn, and Cu as a selective element. Besides, in a case where the soft stainless steel sheet is applied to the battery can, the kind of stainless steel sheet is not particularly limited as long as the amount of C is 0.040% by mass or less, the amount of S is 0.020% by mass or less, and the tensile strength TS is 400 MPa or less. The sheet thickness of the Ni plated steel sheet, the steel sheet for the post Ni plating, and the soft stainless steel sheet is not particularly limited, but the sheet thickness may be 0.20 mm to 0.80 mm in consideration of a balance between the strength and the cost. Particularly, in a case where strength is necessary, it is preferable that the sheet thickness be 0.30 mm or more, more preferably 0.35 mm or more or 0.40 mm or more, and still more preferably 0.45 mm or more. On the other hand, it is preferable that the sheet thickness be 0.75 mm or less to reduce the cost as much as possible.

It is not necessary to limit the above-described production conditions of the Ni plated steel sheet, the steel sheet for the post Ni plating, and the soft stainless steel sheet except for the above component compositions (the amount of C and the amount of S), and the tensile strength TS as long as these steel sheets are suitable for drawing of the battery can for a storage battery. In a case where the Ni plated steel sheet is subjected to the score processing, the blade edge is smooth, and thus damage to the Ni plated layer scarcely occurs. However, in this case, since the Ni plated layer is stretched and becomes thin during the score processing, the Ni plated layer may be set to be slightly thicker than necessary. In addition, for example, the thickness (basis weight) of the plated layer (Ni plated layer) may be controlled to 0.2 μm to 5.0 μm.

As a modification example of the embodiment, for example, the battery can may have a structure as shown in FIGS. 3B to 3F.

Figure 3B:
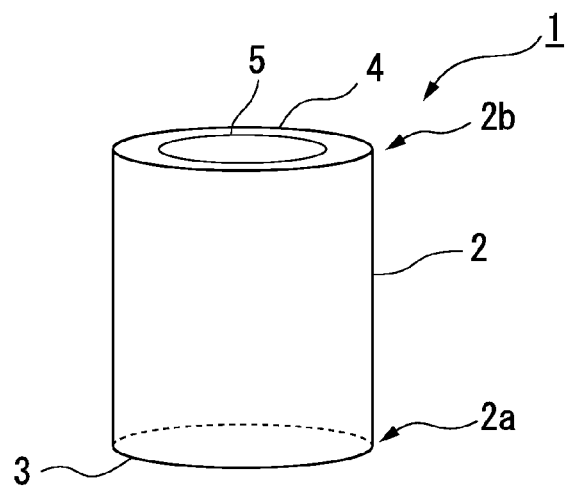
FIG. 3B is a schematic perspective diagram illustrating a battery can according to a modification example of the embodiment.
Figure 3C:
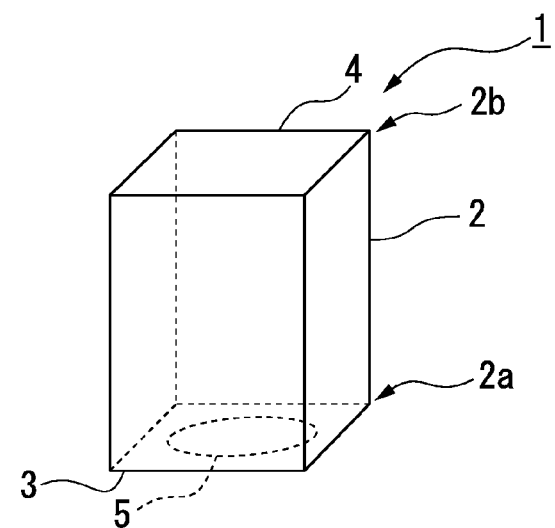
FIG. 3C is a schematic perspective diagram illustrating a battery can according to a modification example of the embodiment.
Figure 3D:
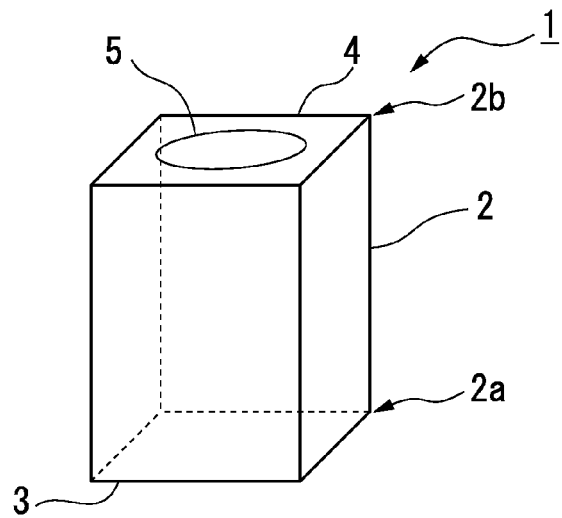
FIG. 3D is a schematic perspective diagram illustrating a battery can according to a modification example of the embodiment.
Figure 3E:
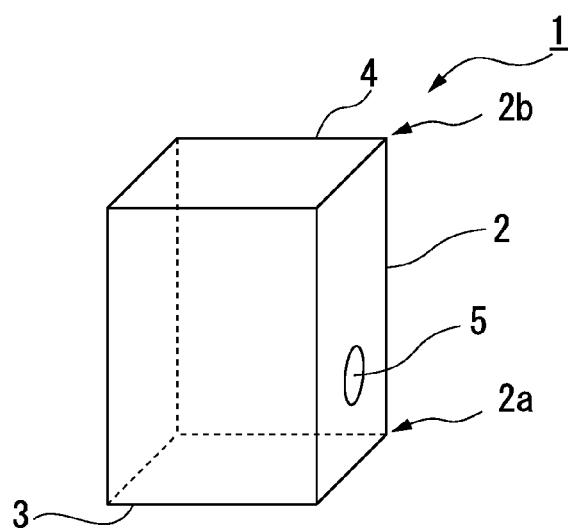
FIG. 3E is a schematic perspective diagram illustrating a battery can according to a modification example of the embodiment.
Figure 3F:
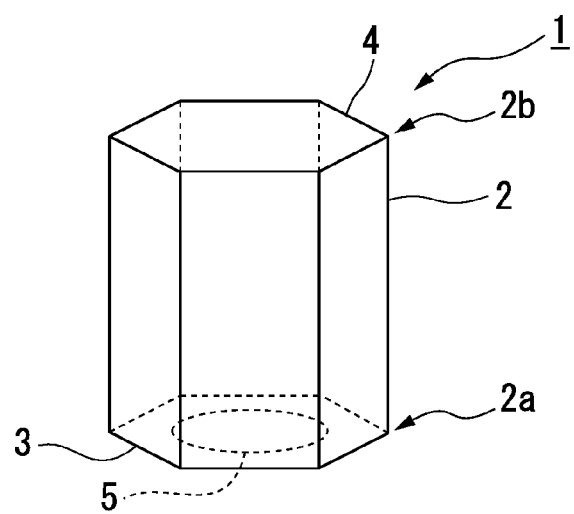
FIG. 3F is a schematic perspective diagram illustrating a battery can according to a modification example of the embodiment.

That is, as shown in FIGS. 3B and 3D, the battery can 1 may be provided with the safety valve 5 at the can lid portion 4, and as shown in FIG. 3E, the battery can 1 may be provided with the safety valve 5 at the can body portion 2. In addition, the shape of the battery can 1 is not particularly limited, and the battery can 1 may be a square can as shown in FIGS. 3C to 3E, or may have a special shape as shown in FIG. 3F. Also, the shape (a shape in a plan view) of the safety valve 5 which is viewed from an upper side of the safety valve 5 is not particularly limited, and may be determined depending on a structure (disposition of a positive electrode and a negative electrode, and the like) inside the battery can in a case of constituting a battery. For example, in a case where the safety valve is provided to the can bottom portion 3 or the can lid portion 4, the safety valve may be disposed in such a manner that the center of the circular safety valve matches the center of the can bottom portion 3 or the can lid portion 4 as shown in FIG. 3A.

As described above, in the embodiment (including the modification example), the battery can 1 may be provided with the safety valve 5 having the score groove portions 5a and 5b in both of the inner surface and the outer surface (in the inner surface and the outer surface, respectively) of any one of the can bottom portion 3, the can body portion 2, and the can lid portion 4.

In addition, when a positive electrode, a negative electrode, and an electrolyte (for example, a separator containing the electrolyte) are accommodated in the battery can 1 according to the embodiment, a storage battery, which includes the battery can 1 according to the embodiment, the positive electrode, the negative electrode, and the electrolyte, may be provided.

Accordingly, the battery can according to the embodiment may be applied as a battery can for a storage battery in which satisfactory stability of the valve opening pressure, satisfactory valve opening characteristics, and satisfactory corrosion resistance under a harsh environment are necessary. Particularly, the battery can for a storage battery may be suitably applied as a battery can for an industrial use (for example, a fixed apparatus), and an in-vehicle use.

That is, in the battery can according to the embodiment, a variance in the valve opening pressure of the score groove portion of an individual battery can may be reduced. In addition, in the battery can of the embodiment, a decrease in the valve opening pressure of the score groove portion by fatigue caused by repetitive variation of inner pressure (repetitive stress) which is loaded on the battery can over a long period of time (10 to 15 years) may be almost prevented. Furthermore, in the battery can according to the embodiment, fracture or cracking of the Ni plated layer, which accompanies the score processing, scarcely occurs, and pitting of the score groove portion, and the like may be suppressed. Accordingly, a decrease in the valve opening pressure of the score groove portion may be almost prevented.

EXAMPLES

Hereinafter, an effect of the invention will be described with reference to examples.

Cast pieces (steel) which contain chemical components shown in steel A to steel E, and steel G to steel H in Table 1 were prepared, and hot rolling and cold rolling were performed under normal conditions to prepare steel sheets (steel). In addition, with respect to steel sheets other than a soft stainless steel sheet (steel F). Ni plating was performed before can production or after can production. In a case where the Ni plating was performed before the can production (prior plating), Ni plating, annealing, and temper rolling were performed with respect to the steel sheet to produce a Ni plated steel sheet, and battery cans (cylindrical can and square can) were prepared from the Ni plated steel sheet. On the other hand, in a case where the Ni plating was performed after the can production (post plating), battery cans were prepared directly from a steel sheet (raw steel sheet) to which the Ni plating was not applied. Similarly, a battery can was prepared directly from a soft stainless steel sheet containing chemical components shown in steel F. Inner pressure was applied to the battery cans to evaluate valve opening characteristics of the respective battery cans. Here, the remainder other than the chemical components shown in Table 1 includes iron and other unavoidable impurities.

TABLE 1

| Steel | Chemical component (% by mass) | | | | | | | | | | TS (MPa) |
|---|---|---|---|---|---|---|---|---|---|---|---|
| | C | Si | Mn | P | S | sol. Al | N | Ti | Nb | B | |
| A | 0.035 | 0.01 | 0.25 | 0.008 | 0.007 | 0.045 | 0.0022 | — | — | — | 335 |
| B | 0.002 | 0.01 | 0.10 | 0.008 | 0.004 | 0.035 | 0.0028 | 0.015 | 0.018 | 0.0003 | 310 |
| C | 0.002 | 0.01 | 0.12 | 0.009 | 0.015 | 0.034 | 0.0022 | 0.035 | 0.013 | 0.0004 | 307 |
| D | 0.005 | 0.01 | 0.20 | 0.007 | 0.005 | 0.045 | 0.0027 | Tr. | 0.022 | Tr. | 365 |
| E | 0.060 | 0.01 | 0.20 | 0.010 | 0.022 | 0.041 | 0.0032 | — | — | — | 330 |
| F | C (0.002% by mass) - S (0.007% by mass) - ferrite-based soft stainless steel | | | | | | | | | | 380 |
| G | 0.150 | 0.01 | 0.15 | 0.010 | 0.015 | 0.045 | 0.0027 | — | 0.018 | — | 375 |
| H | 0.003 | 0.80 | 2.20 | 0.085 | 0.010 | 0.040 | 0.0020 | 0.020 | 0.018 | 0.0010 | 410 |
| I | 0.002 | 0.01 | 0.35 | 0.011 | 0.028 | 0.048 | 0.0025 | 0.005 | 0.025 | 0.0004 | 315 |

In Table 1, "sol. Al" represents soluble Al. In addition, "Tr." represents that the amount of a detected chemical component was small to a degree at which determination of the quantity was impossible. Also, "-" represents that a chemical component was not detected during determination.

In Table 1, test steel A to test steel E, and test steel I are ultralow-carbon steel, and test steel F is an ultralow C-ferrite based soft stainless steel sheet which is sold on the market. In addition, in the steel A, the amount of C is 0.035% by mass, the amount of S is 0.007% by mass, and the tensile strength TS is 335 MPa. In the steel B, the amount of C is 0.002% by mass, the amount of S is 0.004% by mass, and the tensile strength TS is 310 MPa. In the steel C, the amount of C is 0.002% by mass, the amount of S is 0.015% by mass, and the tensile strength TS is 307 MPa. In the steel D, the amount of C is 0.005% by mass, the amount of S is 0.005% by mass, and the tensile strength TS is 365 MPa. In the steel E, the amount of C is 0.060% by mass, the amount of S is 0.022% by mass, and the tensile strength TS is 330 MPa. In the steel F, the amount of C is 0.002% by mass, the amount of S is 0.007% by mass, and the tensile strength TS is 380 MPa. In the steel I, the amount of C is 0.002% by mass, the amount of S is 0.028% by mass, and the tensile strength TS is 315 MPa.

In Table 1, the test steel G and test steel H are high low-carbon steel, and high-strength steel sheet, respectively. In the steel G, the amount of C is 0.150% by mass and is more than 0.100% by mass. In the steel H, the tensile strength TS is 410 MPa, and is more than 400 MPa. Here, an underline in Table 1 represents that the amount of C, the amount of S, and the tensile strength TS are not sufficiently limited.

In addition, in the invention, there is no limitation to the steel sheets, and it is not necessary to particularly limit other conditions of the steel sheets as long as conditions in which the amount of C is 0.100% by mass or less, the amount of S is 0.030% by mass or less, and the tensile strength TS is 400 MPa or less are satisfied. Therefore, in the invention, Ni plated steel sheets which are produced by steel-making, hot rolling, cold rolling, Ni plating, annealing, and temper rolling which are commonly performed, steel sheets to which the Ni plating is not applied (that is, a steel sheet in which the Ni plating is not performed before can production, and the Ni plating is performed after the can production), or a soft stainless steel sheet may be applied, and it is not necessary to particularly regulate a method of producing a steel sheet.

Besides, it is not necessary to particularly limit dying conditions of the battery can, and a dying method thereof, and normal conditions of producing a battery can for a storage battery may be applied as long as the radius of curvature R and the remaining score thickness d can be sufficiently controlled.

Battery cans provided with a score groove type safety valve were produced under conditions shown in Table 2 using steel A to steel I shown in Table 1. Inner pressure was applied to the battery cans, and as valve opening characteristics, stability of the valve opening power, valve opening characteristics, and soundness of the Ni plated layer (excluding post plating and soft stainless steel sheet) were evaluated. The score groove type safety valve was provided to a can bottom portion in circular cans of test Nos. 1 to 22, and 25 to 28, a can lid portion in the square can of test No. 23, and a can side wall portion (can body portion) in the square can of test No. 24, respectively. In test Nos. 1 to 26, the safety valve was a double-sided score, and in test Nos. 27 and 28, the safety valve was a single-sided score.

A variance in a can opening time when the number of cycles n during charging and discharging was increased, deterioration of fatigue strength when repetitive inner pressure was loaded, an extent of an effect on valve opening characteristics by abrasion of a die, and the like were comprehensively evaluated, and stability of the valve opening power was evaluated by three grades including not good (NG in Table 2), good (G in Table 2), and very good (VG in Table 2).

Valve opening pressure that is necessary when the battery can is applied for an industrial use and an in-vehicle use was comprehensively evaluated, the valve opening characteristics being evaluated by three grades including not good (NG in Table 2), good (G in Table 2), and very good (VG in Table 2).

A degree of damage of the plated layer of the score groove portion was evaluated by SEM (scanning electron microscopy), EPMA (electron probe X-ray microanalysis), and the like, and the soundness of the Ni plated layer was evaluated by three grades including not good (NG in Table 2), good (G in Table 2), and very good (VG in Table 2). However, in sample Nos. 12, 18, and 26, post plating was performed, and thus evaluation was not performed ("-" in Table 2). In addition, in sample No. 19, a soft stainless steel sheet was used, and thus evaluation was not performed ("-" in Table 2).

TABLE 2

| | | Dimensions of battery | | | | | | | | Evaluation result *2 | | | |
|---|---|---|---|---|---|---|---|---|---|---|---|---|---|
| | | Ni plating | | can | | | Score shape of safety valve | | | | Valve | | |
| Test No. | Steel | Kind of plating | Outer/Inner μm | Shape | φ mm | Can height mm | Contour mm | Shape of distal end inner/outer mm | Distal end θ° | Remaining thickness μm | Stability | opening characteristic | Soundness | Remarks |
| 1 | A | Prior plating | 2/2 | Circular | 40 | 115 | φ25.5 | Trapezoidal 0.3 W/0.3 W | 60 | 50 | NG | G | NG | Conventional Example |
| 2 | B | Prior plating | 2/2 | Circular | 40 | 115 | φ25.5 | Trapezoidal 0.3 W/0.3 W | 60 | 50 | NG | G | NG | Conventional Example |
| 3 | B | Prior plating | 2/2 | Circular | 40 | 115 | φ25.5 | Triangular 0 R/0 R | 60 | 50 | NG | G | NG | Conventional Example |
| 4 | B | Prior plating | 2/2 | Circular | 40 | 115 | φ25.5 | 0.15 R/0.15 R | 60 | 50 | NG | G | NG | Comparative Example |
| 5 | A | Prior plating | 2/2 | Circular | 40 | 115 | φ25.5 | 0.50 R/0.50 R | 60 | 50 | G | G | G | Example |
| 6 | B | Prior plating | 2/2 | Circular | 40 | 115 | φ25.5 | 0.25 R/0.25 R | 60 | 50 | G | G | G | Example |
| 7 | B | Prior plating | 2/2 | Circular | 40 | 115 | φ25.5 | 0.50 R/0.50 R | 60 | 45 | G | VG | G | Example |
| 8 | B | Prior plating | 2/2 | Circular | 40 | 115 | φ25.5 | 0.50 R/0.50 R | 60 | 50 | VG | VG | G | Example |
| 9 | B | Prior plating | 2/2 | Circular | 40 | 115 | φ25.5 | 0.50 R/0.50 R | 60 | 140 | VG | G | VG | Example |
| 10 | B | Prior plating | 2/2 | Circular | 40 | 115 | φ25.5 | 0.65 R/0.65 R | 60 | 60 | VG | VG | VG | Example |
| 11 | B | Prior plating | 2/2 | Circular | 40 | 115 | φ25.5 | 0.80 R/0.80 R | 60 | 60 | VG | VG | VG | Example |
| 12 | B | Post plating | 2/2 | Circular | 40 | 115 | φ25.5 | 0.50 R/0.50 R | 60 | 60 | VG | VG | — | Example |
| 13 | B | Prior plating | 2/2 | Circular | 40 | 115 | φ25.5 | 1.50 R/1.50 R | 60 | 60 | NG | NG | VG | Comparative Example |
| 14 | B | Prior plating | 2/2 | Circular | 40 | 115 | φ25.5 | 0.50 R/0.50 R | 60 | 30 | NG | VG | NG | Comparative Example |
| 15 | C | Prior plating | 2/2 | Circular | 40 | 115 | φ25.5 | 0.50 R/0.50 R | 60 | 80 | VG | VG | VG | Example |
| 16 | D | Prior plating | 2/2 | Circular | 40 | 115 | φ25.5 | 0.50 R/0.50 R | 60 | 80 | VG | VG | VG | Example |
| 17 | E | Prior plating | 2/2 | Circular | 40 | 115 | φ25.5 | 0.50 R/0.50 R | 60 | 70 | VG | VG | VG | Example |
| 18 | E | Post plating | 2/2 | Circular | 40 | 115 | φ25.5 | 0.50 R/0.50 R | 60 | 60 | VG | VG | — | Example |
| 19 | F | None | 2/2 | Circular | 40 | 115 | φ25.5 | 0.50 R/0.50 R | 60 | 60 | VG | VG | — | Example |
| 20 | G | Prior plating | 2/2 | Circular | 40 | 115 | φ25.5 | 0.50 R/0.50 R | 60 | 50 | NG | VG | NG | Comparative Example |
| 21 | H | Prior plating | 2/2 | Circular | 40 | 115 | φ25.5 | 0.50 R/0.50 R | 60 | 50 | NG | NG | NG | Comparative Example |
| 22 | I | Prior plating | 2/2 | Circular | 40 | 115 | φ25.5 | 0.50 R/0.50 R | 60 | 50 | NG | G | G | Comparative Example |
| 23 | B | Prior plating | 2/2 | Square | *1 | 130 | φ25.5 | 0.50 R/0.50 R | 60 | 60 | VG | VG | VG | Example |
| 24 | B | Prior plating | 2/2 | Square | *1 | 130 | φ25.5 | 0.50 R/0.50 R | 60 | 60 | VG | VG | VG | Example |
| 25 | B | Prior plating | 2/2 | Circular | 40 | 115 | φ25.5 | 0.50 R/0.80 R | 60 | 60 | VG | VG | VG | Example |
| 26 | B | Post plating | 2/2 | Circular | 40 | 115 | φ25.5 | 0.60 R/0.90 R | 60 | 60 | VG | VG | — | Example |
| 27 | B | Prior plating | 2/2 | Circular | 40 | 115 | φ25.5 | Flat/trapezoidal 0.3 W | 60 | 50 | NG | NG | NG | Conventional Example |
| 28 | B | Prior plating | 2/2 | Circular | 40 | 115 | φ25.5 | Flat/triangular 0 R | 60 | 50 | NG | G | NG | Conventional Example |

*1 Length of short side × Length of long side: 40 mm × 100 mm.
*2 NG: Not Good, G: Good, VG: Very Good.

In test No. 1, a cross-sectional shape of the score groove of the safety valve was a trapezoidal shape, and a lower width of the score groove was 0.3 mm (0.3 W). Also, in test No. 2, a cross-sectional shape of the score groove of the safety valve was a trapezoidal shape, and a lower width of the score groove was 0.3 mm (0.3 W). In test No. 3, a cross-sectional shape of the score groove of the safety valve was a triangular shape, and a lower width of the score groove was 0 mm. These test Nos. 1, 2, and 3 were double-sided scores of a score groove type in the related art, and the stability of the valve opening power and the soundness of the Ni plated layer were evaluated as failure (NG).

In test No. 4, the radius of curvature R of the score groove bottom portion was 0.15 mm (that is, 0.20 mm or less), and thus the stability of the valve opening characteristics and the soundness of the Ni plated layer were not sufficient (NG).

In test No. 5, a Ni plated steel sheet of the steel A in which the amount of C was 0.035% by mass, and the amount of S was 0.007% by mass was used as a test steel sheet, the radius of curvature R of the score groove bottom portion was 0.50 mm, and the remaining score thickness d was 50 μm, and thus the stability of the valve opening characteristics, the valve opening characteristics, and the soundness of the Ni plated layer were good (G).

In test Nos. 6, 7, 8, 9, 10, and 11, a Ni plated steel sheet of the steel B in which the amount of C was 0.002% by mass, and the amount of S was 0.004% by mass was used as a test steel sheet, the radius of curvature R of the score groove bottom portion was 0.25 mm to 0.80 mm, and the remaining score thickness d was 45 μm to 140 μm, and thus in Nos. 6, 7, 8, and 9, the stability of the valve opening power, the valve opening characteristics, and the soundness of the Ni plated layer were good (G) or very good (VG). In Nos. 10 and 11, all of the stability of the valve opening power, the valve opening characteristics, and the soundness of the Ni plated layer were very good (VG).

In test No. 12, a steel sheet for post plating of the steel B in which the amount of C was 0.002% by mass, and the amount of S was 0.004% by mass was used as a test steel sheet, the radius of curvature R of the score groove bottom portion was 0.50 mm, and the remaining score thickness d was 60 μm, and thus the stability of the valve opening power and the valve opening characteristics were very good (VG), and the corrosion resistance was also secured by a post plating treatment.

In test Nos. 13 and 14, a Ni plated steel sheet of the steel B in which the amount of C was 0.002% by mass, and the amount of S was 0.004% by mass was used as a test steel sheet. Among these, in test No. 13, since the radius of curvature R of the score groove bottom portion was 1.50 mm (that is, 1.20 mm or more), the stability of the valve opening power, and the valve opening pressure were not good (NG). In test No. 14, since the remaining score thickness d was 30 μm, the stability of the valve opening power and the soundness of the Ni plated layer were not good (NG).

In test No. 15, a Ni plated steel sheet of the steel C in which the amount of C was 0.002% by mass, and the amount of S was 0.015% by mass was used as a test steel sheet, the radius of curvature R of the score groove bottom portion was 0.50 mm, and the remaining score thickness d was 80 μm, and thus the stability of the valve opening power, the valve opening characteristics, and the soundness of the Ni plated layer were very good (VG).

In test No. 16, a Ni plated steel sheet of the steel D in which the amount of C was 0.005% by mass, and the amount of S was 0.005% by mass was used as a test steel sheet, the radius of curvature R of the score groove bottom portion was 0.50 mm, and the remaining score thickness d was 80 μm, and thus the stability of the valve opening power, the valve opening characteristics, and the soundness of the Ni plated layer were very good (VG).

In test No. 17, a Ni plated steel sheet of the steel E in which the amount of C was 0.060% by mass, and the amount of S was 0.022% by mass was used as a test steel sheet, the radius of curvature R of the score groove bottom portion was 0.50 mm, and the remaining score thickness d was 70 μm, and thus the stability of the valve opening power, the valve opening characteristics, and the soundness of the Ni plated layer were very good (VG).

In test No. 18, a Ni plated steel sheet of the steel E in which the amount of C was 0.060% by mass, and the amount of S was 0.022% by mass was used as a test steel sheet, the radius of curvature R of the score groove bottom portion was 0.50 mm, and the remaining score thickness d was 60 μm, and thus the stability of the valve opening power, the valve opening characteristics, and the soundness of the Ni plated layer were very good (VG).

In test No. 19, a ferrite-based low C stainless steel sheet in which the tensile strength TS was 380 MPa, the amount of C was 0.002% by mass, and the amount of S was 0.007% by mass was used as a test steel sheet, the radius of curvature R of the score groove bottom portion was 0.50 mm, and the remaining score thickness d was 60 mm, and thus the stability of the valve opening power, and the valve opening characteristics were very good (VG).

In test No. 20, a Ni plated steel sheet of the steel G in which the amount of C was 0.150% by mass (that is, more than 0.100% by mass) was used as a test steel sheet, and thus the stability of the valve opening power and the soundness of the Ni plated layer were not good (NG). In test No. 21, a Ni plated steel sheet of the steel H in which the amount of C was 0.003% by mass, and the amount of S was 0.010% by mass, but the tensile strength TS was 410 MPa (that is, more than 400 MPa) was used as a test steel sheet, and thus the stability of the valve opening power, valve opening characteristics, and the soundness of the Ni plated layer were not good (NG). In test No. 22, a Ni plated steel sheet of the steel I in which the amount of C was 0.002% by mass, the amount of S was 0.028% by mass, and the tensile strength TS was 315 MPa was used as a test steel sheet, but the remaining score thickness d was 50 μm with respect to a relatively high amount of S (0.020% to 0.030%), and thus the stability of the valve opening power was not good (NG).

In test Nos. 23 and 24, large-sized square battery cans of 40 mm×100 mm×130 mm (height) were prepared using a Ni plated steel sheet of the steel B in which the amount of C was 0.002% by mass, and the amount of S was 0.004% by mass as a test steel sheet, and a safety valve in which the radius of curvature R of the score groove bottom was 0.50 mm and the remaining score thickness d was 60 μm was provided to the large-sized battery cans. The safety valve was provided to a can lid portion in No. 23, and a can side wall portion (can body portion) in No. 24. In Nos. 23 and 24, the stability of the valve opening power, the valve opening characteristics, and the soundness of the Ni plated layer were very good (VG).

In test No. 25, a Ni plated steel sheet of the steel B in which the amount of C was 0.002% by mass, and the amount of S was 0.004% by mass was used as a test steel sheet, the radius of curvature R of the score groove in an inner surface of the can was 0.50 mm, the radius of curvature R of the score groove in an outer surface of the can was 0.80 mm, and the remaining score thickness d was 60 μm. In the test No. 25, the radii of curvature R of the score grooves in the inner and outer surfaces of the can were different from each other, but the stability of the valve opening power, the valve opening characteristics, and the soundness of the Ni plated layer were very good (VG).

In test No. 26, a steel sheet for post plating of the steel B in which the amount of C was 0.002% by mass, and the amount of S was 0.004% by mass was used as a test steel sheet, the radius of curvature R of the score groove in an inner surface of the can was 0.60 mm, the radius of curvature R of the score groove in an outer surface of the can was 0.90 mm, and the remaining score thickness d was 60 μm. In test No. 26, the radii of curvature R of the score grooves in the inner and outer surfaces of the can were also different from each other, but the stability of the valve opening power and the valve opening characteristics were very good (VG), and the corrosion resistance was also secured by a post plating treatment.

In test No. 27, a cross-sectional shape of the score groove of the safety valve was a trapezoidal shape, and a lower width of the score groove was 0.3 mm (0.3 W). In test No. 28, a cross-sectional shape of the score groove of the safety valve was a triangular shape, and a lower width of the score groove was 0 mm. These test Nos. 27 and 28 were single-sided scores of a score groove type in the related art, and the stability of the valve opening pressure and the soundness of the Ni plated layer were evaluated as failure (NG).

In addition, in these test Nos. 27 and 28, the score groove was formed only in the outer surface of the can, and the inner surface (a surface opposite to the score groove) of the can had a flat shape. Also, in test Nos. 27 and 28, a Ni plated steel sheet of the steel B in which the tensile strength TS was 310 MPa, the amount of C was 0.002% by mass, and the amount of S was 0.004% by mass was used as a test steel sheet.

In addition, distal end θ in Table 2 is an angle made by two portions (extension lines of these two portions) of a die which correspond to score groove upper portions, and in a score groove portion having score groove upper portions as shown in FIG. 5B, the groove opening degree θ' corresponds to 0.5 times of the distal end θ.

As is clear from the above-described results, in the battery can for a storage battery which is provided with the score groove type safety valve according to the invention, a variance in the valve opening pressure of the score groove portion of an individual battery can is small, and the valve opening pressure of the score groove portion scarcely decreases by deterioration of the battery can with the passage of time (for example, 10 to 15 years) due to fatigue or corrosion. Accordingly, even when inner pressure is repetitively loaded on the battery can over a long period of time (10 to 15 years), in the battery can for a storage battery which is provided with the score groove type safety valve according to the invention, the valve opening pressure scarcely decreases due to fatigue of the score groove portion. In addition, even when the prior plating is performed, in the battery can for a storage battery which is provided with the score groove type safety valve according to the invention, the valve opening pressure scarcely decreases due to pitting of the score groove portion.

Hereinbefore, the preferred examples of the invention have been described, but the invention is not limited to these examples. Addition, omission, substitution, and other modifications of configuration may be made within a range not departing from the gist of the present invention. The present invention is not limited by the above-described description, and is limited only by the attached claims.

INDUSTRIAL APPLICABILITY

It is possible to provide a battery can for a storage battery which is provided with a score groove type safety valve in which a variance in valve opening pressure of a score groove portion of an individual battery can is small, and valve opening pressure of the score groove portion scarcely decreases by deterioration of the battery can with the passage of time due to fatigue or corrosion.

DESCRIPTION OF REFERENCE NUMERALS AND SIGNS

1: BATTERY CAN (BATTERY CAN FOR STORAGE BATTERY)
2: CAN BODY PORTION (CAN SIDE-WALL PORTION)
2a: END (FIRST END)
2b: END (SECOND END)
3: CAN BOTTOM PORTION (CAN BOTTOM)
3a: STEEL SHEET PORTION (STEEL SHEET)
3b: PLATED LAYER (PLATING)
3c: PLATED STEEL SHEET
4: CAN LID PORTION (CAN LID)
5: SAFETY VALVE
5a, 5b: SCORE GROOVE PORTION
5a1, 5b1: SCORE GROOVE BOTTOM PORTION
5a2, 5b2: SCORE GROOVE UPPER PORTION
R: RADIUS OF CURVATURE
d: REMAINING SCORE THICKNESS
θ': GROOVE OPENING DEGREE

The invention claimed is:

1. A battery can for a storage battery, comprising:
a tubular can body portion having a first end and a second end;
a can bottom portion that is continuous to the can body portion so as to cover the first end of the can body portion; and
a can lid portion that is continuous to the can body portion so as to cover the second end of the can body portion when constituting a battery,
wherein a safety valve having a first score groove portion and a second score groove portion that are opposite to each other in a cross-sectional view in a sheet thickness direction is provided to an inner surface and an outer surface of any one of the can bottom portion, the can body portion, and the can lid portion,
when viewed from a cross-section that is perpendicular to an extension direction of the first score groove portion, the first score groove portion and the second score groove portion have a first score groove bottom portion and a second score groove bottom portion, which have a radius of curvature R and a relative clearance,
wherein the relative clearance is 0.045 mm to 0.150 mm,
wherein the radius of curvature R is more than 0.20 mm and is equal to or less than 1.20 mm, and
any one of the can bottom portion, the can body portion, and the can lid portion, which has the safety valve, is constituted by a plated steel sheet having a steel sheet portion in which the amount of C is limited to 0.040% by mass or less and the amount of S is limited to 0.020% by mass or less, and a tensile strength TS is 400 MPa or less, and a plate layer formed on the steel sheet portion.

2. The battery can for a storage battery according to claim 1,
wherein the plated steel sheet is subjected to score processing by a press forming method.

3. The battery can for a storage battery according to claim 1, wherein after the steel sheet portion is subjected to the score processing by the press forming method, the plated layer is formed on a surface of the steel sheet portion.

4. A battery can for a storage battery, comprising:
a tubular can body portion having a first end and a second end;
a can bottom portion that is continuous to the can body portion so as to cover the first end of the can body portion; and
a can lid portion that is continuous to the can body portion so as to cover the second end of the can body portion when constituting a battery,
wherein a safety valve having a first score groove portion and a second score groove portion that are opposite to each other in a cross-sectional view in a sheet thickness direction is provided to an inner surface and an outer surface of any one of the can bottom portion, the can body portion, and the can lid portion,
when viewed from a cross-section that is perpendicular to an extension direction of the first score groove portion, the first score groove portion and the second score groove portion have a first score groove bottom portion and a second score groove bottom portion, which have a radius of curvature R and a relative clearance,
wherein the relative clearance is 0.055 mm to 0.150 mm,
wherein the radius of curvature R is 0.30 mm to 1.20 mm, and
any one of the can bottom portion, the can body portion, and the can lid portion, which has the safety valve, is constituted by a plated steel sheet having a steel sheet portion in which the amount of C is limited to 0.100% by mass or less and the amount of S is limited to 0.030% by mass or less, and a tensile strength TS is 400 MPa or less, and a plate layer formed on the steel sheet portion.

5. The battery can for a storage battery according to claim 4,
wherein the plated steel sheet is subjected to score processing by a press forming method.

6. The battery can for a storage battery according to claim 4,
wherein after the steel sheet portion is subjected to the score processing by the press forming method, the plated layer is formed on a surface of the steel sheet portion.

7. The battery can for a storage battery according to claim 1,
wherein the plated layer is Ni plating.

8. The battery can for a storage battery according to claim 1,
wherein the radius of curvature R is 0.30 mm to 1.20 mm.

9. The battery can for a storage battery according to claim 8,
wherein the plated layer is Ni plating.

10. A battery can for a storage battery, comprising:
a tubular can body portion having a first end and a second end;
a can bottom portion that is continuous to the can body portion so as to cover the first end of the can body portion; and
a can lid portion that is continuous to the can body portion so as to cover the second end of the can body portion when constituting a battery,
wherein a safety valve having a first score groove portion and a second score groove portion that are opposite to each other in a cross-sectional view in a sheet thickness direction is provided to an inner surface and an outer surface of any one of the can bottom portion, the can body portion, and the can lid portion,
when viewed from a cross-section that is perpendicular to an extension direction of the first score groove portion, the first score groove portion and the second score groove portion have a first score groove bottom portion and a second score groove bottom portion, which have a radius of curvature R and a relative clearance,
wherein the relative clearance is 0.045 mm to 0.150 mm,
wherein the radius of curvature R is more than 0.20 mm and is equal to or less than 1.20 mm, and
any one of the can bottom portion, the can body portion, and the can lid portion, which has the safety valve, is constituted by a stainless steel sheet in which the amount of C is limited to 0.040% by mass or less and the amount of S is limited to 0.020% by mass or less, and a tensile strength TS is 400 MPa or less.

11. The battery can for a storage battery according to claim 10,
wherein the stainless steel sheet is subjected to score processing by a press forming method.

12. The battery can for a storage battery according to claim 10,
wherein the radius of curvature R is 0.30 mm to 1.20 mm.

13. The battery can for a storage battery according to claim 2,
wherein the plated layer is Ni plating.

14. The battery can for a storage battery according to claim 3,
wherein the plated layer is Ni plating.

15. The battery can for a storage battery according to claim 4,
wherein the plated layer is Ni plating.

16. The battery can for a storage battery according to claim 5,
wherein the plated layer is Ni plating.

17. The battery can for a storage battery according to claim 6,
wherein the plated layer is Ni plating.

18. The battery can for a storage battery according to claim 2,
wherein the radius of curvature R is 0.30 mm to 1.20 mm.

19. The battery can for a storage battery according to claim 3,
wherein the radius of curvature R is 0.30 mm to 1.20 mm.

20. The battery can for a storage battery according to claim 11,
wherein the radius of curvature R is 0.30 mm to 1.20 mm.

* * * * *